United States Patent
Takahashi

(10) Patent No.: US 7,053,569 B2
(45) Date of Patent: May 30, 2006

(54) INVERTER CONTROL METHOD AND ITS DEVICE

(75) Inventor: Isao Takahashi, deceased, late of Niigata (JP); by Yuko Takahashi, legal representative, 463, Kitayama-cho4-chome, Nagaoka-shi, Niigata 940-2114 (JP); by Miwa Jibiki, legal representative, 7-611, Morooka-cho 265-chome, Minatokita-ku, Yokohama-shi, Kanagawa 222-0002 (JP); by Minako Takahashi, legal representative, 301, Futoo-cho 312-chome, Minatokita-ku, yokohama-shi, Kanagawa 222-0031 (JP); by Mamoru Takahashi, legal representative, C-106, 18-1, Funakura 1-chome, Yokosuka-shi, Kanagawa 239-0805 (JP); by Hiroyuki Yamai, Shiga (JP)

(73) Assignees: Daikin Industries, Ltd., Osaka (JP); Yuko Takahashi, Nagaoka (JP); Miwa Jibiki, Yokohama (JP); Minako Takahashi, Yokohama (JP); Mamoru Takahashi, Yokosuka (JP)

( * ) Notice: Subject to any disclaimer, the term of this patent is extended or adjusted under 35 U.S.C. 154(b) by 114 days.

(21) Appl. No.: 10/478,411

(22) PCT Filed: May 22, 2002

(86) PCT No.: PCT/JP02/04969

§ 371 (c)(1),
(2), (4) Date: Feb. 23, 2004

(87) PCT Pub. No.: WO02/095918

PCT Pub. Date: Nov. 28, 2002

(65) Prior Publication Data

US 2004/0232863 A1 Nov. 25, 2004

(30) Foreign Application Priority Data

May 24, 2001 (JP) ............................. 2001-155477

(51) Int. Cl.
  *H02P 7/28* (2006.01)
(52) U.S. Cl. .................... 318/254; 318/504; 318/609
(58) Field of Classification Search ................ 318/138, 318/254, 432, 433, 439, 459, 504, 609, 610, 318/720–724; 388/928.1
See application file for complete search history.

(56) References Cited

U.S. PATENT DOCUMENTS 4,788,485 A * 11/1988 Kawagishi et al. ......... 318/811

(Continued)

FOREIGN PATENT DOCUMENTS

EP    1 049 241 A2    11/2000

(Continued)

*Primary Examiner*—Bentsu Ro
(74) *Attorney, Agent, or Firm*—Birch, Stewart, Kolasch & Birch, LLP

(57) ABSTRACT

An inverter controlling method is applied in a system comprising a single-phase rectification circuitry and three-phase inverter. The method determines a capacitance of a capacitor connected between output terminals of the single-phase rectification circuitry for allowing an output voltage of the single-phase rectification circuitry to pulsate at twice frequency with respect to a power frequency; controls the three-phase inverter for supplying output voltages or output currents from the three-phase inverter to a motor; and suppresses a current flowing into the capacitor from a power source via the single-phase rectification circuitry.

13 Claims, 19 Drawing Sheets

U.S. PATENT DOCUMENTS 6,307,759 B1 * 10/2001 Inarida et al. ................ 363/37
6,313,602 B1    11/2001 Arefeen et al.
6,437,997 B1 *  8/2002 Inarida et al. ................ 363/37
6,459,597 B1 * 10/2002 Igarashi et al. .............. 363/39
6,522,098 B1 *  2/2003 Majumdar et al. .......... 318/801
6,525,497 B1 *  2/2003 Lee et al. ................... 318/432

FOREIGN PATENT DOCUMENTS

JP      6-225538 A      8/1994
JP     11-262300 A      9/1999

* cited by examiner

Fig. 17
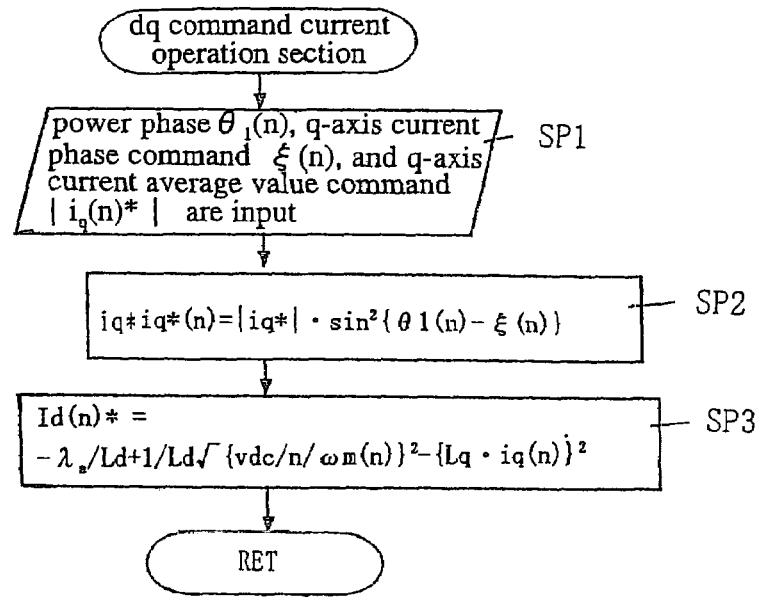
Fig. 18       Background Art
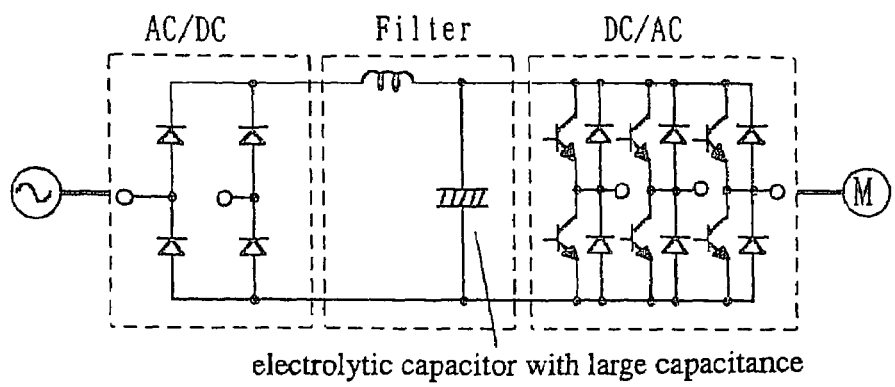

film condenser with small capacitance
(capacitance which is about 1／100
of capacitance in conventional inverter)

INVERTER CONTROL METHOD AND ITS DEVICE

This application is the national phase under 35 U.S.C. § 371 of PCT International Application No. PCT/JP02/04969 which has an International filing date of May 22, 2002, which designated the United States of America.

TECHNICAL FIELD

The present invention relates to an inverter controlling method and apparatus thereof. More particularly, the present invention relates to a method and apparatus for controlling a three-phase inverter, for supplying output voltages or output currents of the three-phase inverter to a motor, which method and apparatus include therein a single phase rectification circuitry and the three-phase inverter and determine a capacitance of a capacitor connected between output terminals of the single phase rectification circuitry so as to pulsate an output voltage of the single phase rectification circuitry by a frequency which is twice of a power frequency.

BACKGROUND ART

As is known from the past, an inverter circuitry is a circuitry which transforms a DC power into an AC power with variable frequency and variable voltage with high efficiency by switching controlling of transistors.

And, an inverter circuitry is widely applied to home electric devices and industrial devices which are required controlling of rotation numbers or a torque of a motor, for example.

In general, a diode-bridge circuitry having a simple circuit configuration is employed for transforming an AC power into a DC power, and a smoothing capacitor having a large capacitance is employed for removing voltage ripples which appear in rectified voltage.

In this case, disadvantages arise such that a power factor in power side is lowered, and harmonics are increased. For preventing or suppressing such disadvantages, a power factor improvement reactor having a large inductance is connected to input side or DC side of the diode-bridge circuitry (refer to FIG. 18).

In recent years, it is proposed that a chopper comprising a transistor, diode and the like, is provided in the DC side of the diode-bridge circuitry, for the purpose of improvement in characteristics for power source power factor and power source harmonics (refer to FIG. 20).

When such inverter circuitry is employed, a smoothing capacitor having a large capacitance and a power factor improvement reactor are needed. Therefore, disadvantages arise such that a size becomes greater following the employment of those elements, and increase in cost is realized.

For realizing high performance in power source harmonics characteristics, a chopper circuitry is further needed. Therefore, further increase in cost is realized.

An electrolytic capacitor is generally employed as the smoothing capacitor having a large capacitance. Therefore, disadvantages arise such that a lifetime of an inverter circuitry including a diode-bridge circuitry becomes shorter due to a short lifetime of an electrolytic capacitor, and usage environment of an inverter circuitry including a diode-bridge circuitry is limited due to thermal characteristics of an electrolytic capacitor.

To dissolve those disadvantages, an inverter controlling method is proposed (refer to "Inverter controlling method of a PM motor having a diode rectification circuitry with a high input power factor", Isao Takahashi, Heisei 12 nen (2000) denkigaklcai (Electronics Institute) zennkoku taikai (national convention), p1591, which is referred to Article 1 hereinafter). The inverter controlling method realizes increasing input power factor and improvement in performance of power source harmonics characteristics by allowing motor currents flowing into a motor even when a DC voltages pulsates and greatly lowered, and consequently widening a conduction width of an inverter input (input of a rectification circuitry) which are due to omitting a smoothing capacitor having a large capacitance in a rectification section, varying a d-axis current with a frequency which is twice of a power frequency, lowering motor terminal voltages by field weakening control.

When this method is employed, an input power factor of a rectification circuitry is improved by controlling an output of an inverter connected to the rectification circuitry to have a desired waveform. Decreasing in power source harmonics can be expected. Therefore, an electrolytic capacitor having a large capacitance, reactor, and chopper become unnecessary which are conventionally necessary to realize those advantages.

Further, "High efficiency inverter controlling method of IPM motor with weak field", Jin Haga, Isao Takahashi, Heisei 13 nen (2001) denkigakkai. (Electronics Institute) zennkoku taikai (national convention), p1214 (referred to Article 2 hereinafter) is proposed as a controlling method based upon the Article 1.

When the inverter circuitry having the arrangement of FIG. 18 is employed, an AC power is rectified by the diode-bridge rectification circuitry, and is smoothened by the electrolytic capacitor having a large capacitor (for example, about 2000 μF for motor capacitance of 2.2 kW). This smoothened output is supplied to the inverter for driving the motor.

When an inverter circuitry is employed for home devices, a reactor (about 3.5 mH when a capacitance of a capacitor is 2000 μF) is connected between a rectification circuitry and a capacitor, or between an AC power and a rectification circuitry, for improving a power factor.

FIG. 19 shows the DC voltage (the voltage between both terminals of the electrolytic capacitor) $V_{dc}$, the power current (the current flows from the AC power to the rectification circuitry) $i_1$, the absolute value $|v_i|$ of the AC voltage obtained by the rectification of the rectification circuitry, and a fundamental component of the power current $i_i$ of the inverter circuitry of FIG. 18. The absolute value $|v_i|$ of the AC voltage and the fundamental component of the power current $i_1$ are not values which are directly measured from the, inverter circuitry.

φ in FIG. 19 represents a phase difference between the AC voltage $v_i$ and the fundamental wave of the power current $i_1$, that is a power factor.

The power factor cos φ of the inverter circuitry of FIG. 18 is low and is up to about 80% (φ=37°. When the magnitude of the absolute value $|v_i|$ of the AC voltage exceeds the smoothened voltage $V_{dc}$ between terminals of the electrolytic capacitor, the diode of the rectification circuitry turns on and the power current $i_1$ flows therein. Therefore, the waveform of the power current $i_1$ is deformed, and the magnitudes of low harmonics (third, 5-th, 7-th, and the like) are extremely large which are obtained by the harmonic analysis of the power current $i_1$, which are not illustrated. A reactor having a large inductance value is needed for a filter for eliminating low harmonics. Therefore, disadvantages arise such that increase in cost, and increase in entire size of the inverter device.

An inverter circuitry of FIG. 20 further includes a chopper circuitry comprising a transistor $T_c$ and diode $D_c$. By controlling the transistor $T_c$ to turn on, the power current can be flows therein even for a period when the power current $i_1$ does not flow therein for the inverter circuitry of FIG. 18 (a period when the voltage $V_{dc}$ between terminals of the electrolytic capacitor exceeds the amplitude of the absolute value $|v_s|$ of the AC voltage). And, the power current $i_1$ can be made to have a sine shape by adequately controlling the on-duty of the transistor $T_c$. Reverse flow of the current from the capacitor to the transistor $T_c$ is prevented by the diode $D_c$.

But, the inverter circuitry of FIG. 20 requires not only the transistor $T_c$ and diode $D_c$ but also a circuitry for controlling the transistors $T_c$ in comparison with the inverter circuitry of FIG. 18. Therefore, it becomes very difficult that the inverter circuitry of FIG. 20 is employed in home electric devices.

FIG. 21 shows an inverter circuitry disclosed in the Article 1 for dissolving those problems.

The inverter circuitry of FIG. 21 is different from the inverter of FIG. 18 in that a capacitor having small capacitance (for example, a capacitor having capacitance of about ¹⁄₁₀₀ capacitance value) is employed instead the electrolytic capacitor having large capacitance.

When the inverter circuitry of FIG. 21 (hereinafter, referred to as condenser-less inverter circuitry) is employed, the DC voltage changes from $V_{max}$ (the maximum value of the power voltage $v_1$) to $V_{min}$, determined in correspondence with the induction voltage generated by the motor along the absolute value $|v_s|$ of the power voltage, as is illustrated in FIG. 22, by adequately controlling the currents flowing in the motor through the inverter, because the capacitance of the capacitor is very small. Wherein, $V_{min}$ can be controlled by the field control of the motor.

As a result, waveform distortion of the power current $i_1$ becomes smaller with respect to the case of FIG. 19.

When the flowing period of the power current $i_1$ is determined to be $\theta$, the power factor $\cos \phi$ can be calculated by an equation (1).

$$\cos \phi = \sqrt{(\theta + \sin\theta)/\pi} \quad \text{equation (1)}$$

From the equation (1), the power factor ($\cos \phi$) becomes equal to or more than 97% when $V_{max}/V_{min}\{=\cos(\theta/2)\}>2$.

FIG. 23 is a block diagram illustrating an arrangement of an inverter controlling apparatus for controlling an IPM motor using the inverter circuitry of FIG. 21 and for implementing the controlling method disclosed in the Article 2 for obtaining desired performance.

This inverter controlling apparatus comprises a PI operation section 111, $\sin^2 \theta_1$ generation section 112, and q-axis current command operation section 110. The PI operation section 111 receives a deviation of a speed command $\omega_m^*$ and a real motor speed $\omega_m$ as an input, and outputs a value $|i_q^*|$ by carrying out PI operation (proportional and integral operation). The $\sin^2 \theta_1$ generation section 112 receives a power voltage $v_1$ as an input and outputs a signal $\sin^2 \theta_1$ which is in synchronism with the power voltage. The q-axis current command operation section 110 obtains a product of the signal $\sin^2 \theta_1$ and the value $|i_q^*|$, and outputs the product as a q-axis current command $i_q^*$.

This inverter controlling apparatus further comprises an $i_d^*$ operation section 114, PI operation sections 115 and 116 for d-axis and q-axis, and a non-interacting controlling section 117. The $i_d^*$ operation section 114 receives a DC voltage $V_{dc}$, q-axis current $i_q$, and a real motor speed $\omega_m$ as inputs, and outputs a d-axis current command $i_d^*$ by carrying out the operation of equation (2). The PI operation sections 115 and 116 receives deviations of dq-axes current commands $i_d^*$ and $i_q^*$ and dq-axes real currents $i_d$ and $i_q$ and output first dq-axes voltage commands $v_d^*$ and $v_q^*$ by carrying out PI operation. The non-interacting controlling section 117 receives the first dq-axes voltage commands $v_d^{*\prime}$ and $v_q^{*\prime}$ as inputs and outputs second dq-axes voltage commands $v_d^*$ and $v_q^*$ by carrying out the operation of equation (3).

$$i_d^* = -\frac{\lambda_a}{L_d} + \sqrt{\left(\frac{vdc}{n \cdot \omega_m}\right)^2 - (L_q \cdot i_q)^2} \quad \text{Equation (2)}$$

$$v_q^* = v_q^{*\prime} + (\lambda_a + L_d \cdot i_d) \cdot n \cdot \omega_m \quad \text{Equation (3)}$$
$$v_d^* = v_d^{*\prime} - L_q \cdot i_q \cdot n \cdot \omega_m$$

It is thought that the power current $i_1$ illustrated in FIG. 22 can be obtained when the inverter controlling apparatus of FIG. 23 is employed, and when the q-axis current is controlled to be $i_q^* \sin^2 \theta_1$.

FIG. 24 is a diagram illustrating waveforms in a case that a DC voltage (voltage between both terminals of a capacitor) is controlled from $V_{max}$ to 0 by the field control of a motor. For convenience, a phase $\theta_2$ is applied Fourier transformation by determining a phase to be 0° (360°) which corresponds to the maximum value of the DC voltage $V_{dc}$, so that an equation (4) is obtained.

$$v_{dc} = \frac{2 \cdot V_{max}}{\pi}\left\{1 + \sum_{n=1}^{\infty}\left[\frac{(-1)^n}{2n+1} + \frac{(-1)^{n+1}}{2n-1}\right] \cdot \cos n\theta_2\right\} \quad \text{Equation (4)}$$

Wherein, $\theta_2 = 2 \cdot \theta_1$ ($\theta_1$ is a power voltage phase)

A magnitude of a current amplitude becomes an equation (5) which current flows through a capacitor due to an AC component in a DC voltage $V_{dc}$.

$$|i_{chn}| = \quad \text{Equation (5)}$$

$$2\pi \cdot f_{2n} \cdot C \cdot |v_{dchn}| = 4 \cdot f_{2n} \cdot C \cdot V_{max} \cdot \left\{\frac{(-1)^n}{2n+1} + \frac{(-1)^{n+1}}{2n-1}\right\}$$

herein, $f_{2n} = 2 \cdot n \cdot f_1$ ($f_1$: power frequency, $n = 1, 2, 3 \cdots$)

When $V_{max}$=283 V (power voltage effective value=200 V, power frequency is 50 Hz), an amplitude $V_{dch1}$ of twice frequency component with respect to a power frequency (n=1 in the equation (4)) becomes 120 V.

When a capacitance of a capacitor is determined to be 20 µF which is ¹⁄₁₀₀ of the conventional capacitance, a magnitude of the current becomes $|V_{ch1}|$=1.5 A from the equation (5). And, the phase becomes a phase which is illustrated in FIG. 24.

FIG. 25 shows an ideal controlling waveform thought in the Article 2 (a power current $i_1$ when a DC voltage $v_{dc}$ can be adjusted from 0 to $V_{max}$), capacitor current $i_{ch1}$, and a distortion of a power current waveform when only the controlling of the Article 2 is carried out that is no compensation is made for the capacitor current $i_{ch1}$. In practice, $i_{ch2}$, $i_{ch3}$, ¤¤flow, but illustration is omitted for convenience.

That is, in the inverter controlling apparatus of FIG. 21, the DC voltage $v_{dc}$ greatly pulsates, includes AC component having a large amplitude. Therefore, currents $i_{ch1}$, $i_{ch2}$, $i_{ch3}$, ¤¤which flow into the capacitor from the power source through the single-phase rectification circuitry, are generated so-that the power current waveform is distorted.

Disadvantage arises that harmonics of the power current (input current) i1 cannot be controlled to be smaller (in ideal, cannot be controlled to be a sine wave) when the capacitor current is not compensated.

The present invention was made in view of the above problems.

It is an object of the present invention to provide an inverter controlling method and apparatus thereof which can carry out controlling for suppressing a current flowing into a capacitor from a power source through a single-phase rectification circuitry.

DISCLOSURE OF THE INVENTION

An inverter controlling method according to an aspect of the present invention includes a single-phase rectification circuitry and three-phase inverter, determines a capacitance of a capacitor so as to greatly pulsate an output voltage from the single-phase rectification circuitry at twice frequency of a power frequency, which capacitance is connected between output terminals of the single-phase rectification circuitry, and carries out controlling for suppressing the current flowing into the capacitor from the power source through the single-phase rectification circuitry when the three-phase inverter is controlled so as to supply output voltage or output current from the three-phase inverter to a motor.

An inverter controlling method according to an aspect of the present invention controls the motor for suppressing the current flowing into the capacitor from the power source through the single-phase rectification circuitry.

An inverter controlling method according to an aspect of the present invention controls torque or current for torque for suppressing the current flowing into the capacitor from the power source through the single-phase rectification circuitry.

An inverter controlling apparatus according to an aspect of the present invention is an apparatus which comprises a single-phase rectification circuitry and a three-phase inverter, determines a capacitance of a capacitor connected between output terminals of the single-phase rectification circuitry so as to allow an output voltage from the single-phase rectification circuitry to pulsate at a frequency which is twice of a power frequency, and controls the three-phase inverter so as to supply an output voltage or output current from the three-phase inverter to a motor, the apparatus comprises suppression means for suppressing the current flowing into the capacitor from the power source through the single-phase rectification circuitry.

An inverter controlling apparatus according to an embodiment of the present invention is an apparatus which comprises a single-phase rectification circuitry and a three-phase inverter, determines a capacitance of a capacitor connected between output terminals of the single-phase rectification circuitry so as to allow an output voltage from the single-phase rectification circuitry to pulsate at a frequency which is twice of a power frequency, and controls the three-phase inverter so as to supply an output voltage or output current from the three-phase inverter to a motor, the apparatus comprises controlling means for carrying out controlling for suppressing the current flowing into the capacitor from the power source through the single-phase rectification circuitry.

An inverter controlling apparatus according to an embodiment of the present invention employs controlling means for controlling the motor for suppressing the current flowing into the capacitor from the power source through the single-phase rectification circuitry, as the controlling means.

An inverter controlling apparatus according to an embodiment of the present invention employs controlling means for controlling a torque or current for torque for suppressing the current flowing into the capacitor from the power source through the single-phase rectification circuitry, as the controlling means.

An inverter controlling apparatus according to an embodiment of the present invention is an apparatus which comprises a single-phase rectification circuitry and a three-phase inverter, determines a capacitance of a capacitor connected between output terminals of the single-phase rectification circuitry so as to allow an output voltage from the single-phase rectification circuitry to pulsate at a frequency which is twice of a power frequency, and controls the three-phase inverter so as to supply an output voltage or output current from the three-phase inverter to a motor, the apparatus comprises capacitor current operation means for obtaining a capacitor current flowing into the capacitor from the power source through the single-phase rectification circuitry, and current for torque correction means for correcting a current for torque by subtracting the obtained capacitor current from the current for torque.

An inverter controlling apparatus according to an aspect of the present invention employs capacitor current operation means for carrying out harmonics analysis for the power current, as the capacitor current operation means.

An inverter controlling apparatus according to an aspect of the present invention employs a component of a frequency which is twice of the power frequency, as the harmonics analysis result.

An inverter controlling apparatus according to an aspect of the present invention employs capacitor current operation means for outputting the capacitor current based upon the stored pattern, as the capacitor current operation means.

An inverter controlling apparatus according to an aspect of the present invention further comprises correction means for correcting the capacitor current based upon the DC voltage detection value, the capacitor current being output based upon the stored pattern.

An inverter controlling apparatus according to an aspect of the present invention employs controlling means including phase determination means for determining a phase of the current for torque to be a phase of delay, as the controlling means.

When the inverter controlling method according to an aspect of the present invention is employed, the method includes a single-phase rectification circuitry and three-phase inverter, determines a capacitance of a capacitor so as to greatly pulsate an output voltage from the single-phase rectification circuitry at twice frequency of a power frequency, which capacitance is connected between output terminals of the single-phase rectification circuitry, and carries out controlling for suppressing the current flowing into the capacitor from the power source through the single-phase rectification circuitry when the three-phase inverter is controlled so as to supply output voltage or output current from the three-phase inverter to a motor. Therefore, harmonics in the power current can be reduced.

When the inverter controlling method according to an aspect of the present invention is employed, the method controls the motor for suppressing the current flowing into the capacitor from the power source through the single-phase rectification circuitry. Therefore, operations and effects as described above are realized by the carrying out torque control of the motor or speed control of the motor.

When the inverter controlling method according to an aspect of the present invention is employed, the method controls torque or current for torque for suppressing the current flowing into the capacitor from the power source through the single-phase rectification circuitry. Therefore, operations and effects as described above are realized by controlling the torque or current for torque.

When the inverter controlling apparatus according to an aspect of the present invention is employed, the apparatus comprises a single-phase rectification circuitry and a three-phase inverter, determines a capacitance of a capacitor connected between output terminals of the single-phase rectification circuitry so as to allow an output voltage from the single-phase rectification circuitry to pulsate at a frequency which is twice of a power frequency, and controls the three-phase inverter so as to supply an output voltage or output current from the three-phase inverter to a motor, and suppresses the current flowing into the capacitor from the power source through the single-phase rectification circuitry by the suppression means. Therefore, harmonics in the power current can be reduced.

When the inverter controlling apparatus according to an aspect of the present invention is employed, the apparatus comprises a single-phase rectification circuitry and a three-phase inverter, determines a capacitance of a capacitor connected between output terminals of the single-phase rectification circuitry so as to allow an output voltage from the single-phase rectification circuitry to pulsate at a frequency which is twice of a power frequency, and controls the three-phase inverter so as to supply an output voltage or output current from the three-phase inverter to a motor, and carries out controlling for suppressing the current flowing into the capacitor from the power source through the single-phase rectification circuitry by the controlling means. Therefore, harmonics in the power current can be reduced.

When the inverter controlling apparatus according to an aspect of the present invention is employed controlling means for controlling the motor for suppressing the current flowing into the capacitor from the power source through the single-phase rectification circuitry is employed as the controlling means. Therefore, operations and effects as described above are realized by carrying out torque control of the motor or speed control of the motor.

When the inverter controlling apparatus according to an aspect of the present invention is employed, controlling means for controlling a torque or current for torque for suppressing the current flowing into the capacitor from the power source through the single-phase rectification circuitry is employed as the controlling means. Therefore, operations and effects similar to those of claim 1 are realized by controlling the torque or current for torque.

When the inverter controlling apparatus according to an aspect of the present invention is employed, the apparatus comprises a single-phase rectification circuitry and a three-phase inverter, determines a capacitance of a capacitor connected between, output terminals of the single-phase rectification circuitry so as to allow an output voltage from the single-phase rectification circuitry to pulsate at a frequency which is twice of a power frequency, and controls the three-phase inverter so as to supply an output voltage or output current from the three-phase inverter to a motor. When the above operation is realized, a capacitor current flowing into the capacitor from the power source through the single-phase rectification circuitry is obtained by the capacitor current operation means, and the current for torque is corrected by subtracting the obtained capacitor current from the current for torque by the current for torque correction means. Therefore, harmonics in power current can be decreased by denying the capacitor current.

When the inverter controlling apparatus according to an aspect of the present invention is employed, capacitor current operation means for carrying out harmonics analysis for the power current is employed as the capacitor current operation means. Therefore, operations and effects as described above are realized.

When the inverter controlling apparatus according to an aspect of the present invention is employed, a component of a frequency which is twice of the power frequency is employed as the harmonics analysis result. Therefore, operation load can be decreased, and operations and effects similar to those discussed above are realized.

When the inverter controlling apparatus according to an aspect of the present invention is empldyed, capacitor current operation means for outputting the capacitor current based upon the stored pattern is employed as the capacitor current operation means. Therefore, operation load can be decreased, and operations and effects similar to those discussed above are realized.

When the inverter controlling apparatus according to an aspect of the present invention is employed, the apparatus further comprises correction means for correcting the capacitor current based upon the DC voltage detection value, the capacitor current being output based upon the stored pattern. Therefore, the capacitor current can be calculated with accuracy, and operations and effects similar to those discussed above are realized.

When the inverter controlling apparatus according to an aspect of the present invention is employed, controlling means including phase determination means for determining a phase of the current for torque to be a phase of delay is employed as the controlling means. Therefore, compensation of the capacitor current can be carried out easily, and operations and effects similar to those discussed above are realized.

When the inverter controlling apparatus of claim 12 is employed, the apparatus further comprises correction means for correcting the capacitor current based upon the DC voltage detection value, the capacitor current being output based upon the stored pattern. Therefore, the capacitor current can be calculated with accuracy, and operations and effects similar to those of claim 11 are realized.

When the inverter controlling apparatus of claim 13 is employed, controlling means including phase determination means for determining a phase of the current for torque to be a phase of delay is employed as the controlling means. Therefore, compensation of the capacitor current can be carried out easily, and operations and effects similar to those of claim 7 are realized.

BRIEF DESCRIPTION OF THE DRAWINGS

FIG. 17 is a flowchart describing another example of processing according to the present invention of the step SP3 in FIG. 14.

FIG. 18 is an electric circuitry diagram illustrating an example of an arrangement of a conventional inverter circuitry;

BEST MODE FOR CARRYING OUT THE INVENTION

Hereinafter, referring to the attached drawings, we explain embodiments of an inverter controlling method and apparatus according to the present invention, in detail.

Figure 1:
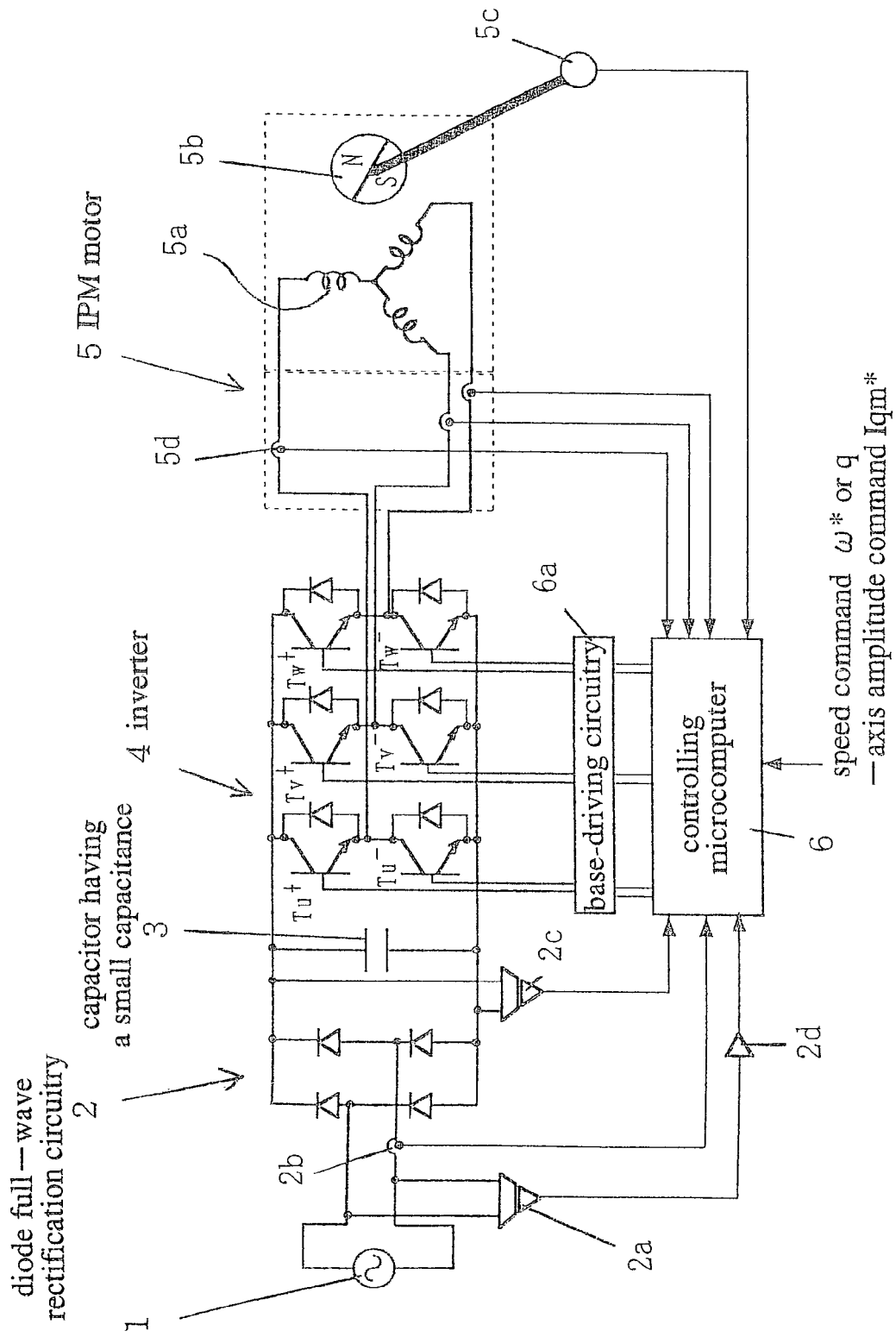
FIG. 1 is a diagram schematically illustrating a controlling system which includes an inverter controlling apparatus according to the present invention therein.

FIG. 1 is a diagram schematically illustrating a controlling system which includes an inverter controlling apparatus according to the present invention therein.

This controlling system comprises a diode full-wave rectification circuitry (single-phase rectification circuitry) 2 which receives an AC power source 1 as an input, a capacitor 3 having a small capacitance (for example, a film condenser) which is connected between output terminals of the diode full-wave rectification circuitry 2, an inverter (three-phase inverter) 4 which receives an output voltage from the diode full-wave rectification circuitry 2 as an input, an IPM motor 5 having a rotor 5b and stator windings 5a which are supplied outputs from the inverter 4, a position detection section 5c for detecting a rotational position (magnetic pole position) of the rotor 5b of the IPM motor 5, input voltage detection section 2a for detecting an input voltage of the diode full-wave rectification circuitry 2, a power current detection section 2b for detecting a power current of the diode full-wave rectification circuitry 2, a DC voltage detection section 2c for detecting a voltage on the output side of the diode full-wave rectification circuitry 2, a zero-cross detection section 2d for detecting a zero-cross of the input voltage, a controlling microcomputer 6, and a base-driving circuitry 6a. The controlling, microcomputer 6 receives the position detection signal, motor currents, zero-cross detection signal, power current, DC voltage, and speed command $\omega^*$ or q-axis current amplitude command $I_{qm}^*$ given from the exterior, as inputs, and outputs controlling signals by carrying out predetermined controlling operation. The base-driving circuitry 6a receives the controlling signals as inputs and outputs switching signals each of which is supplied to each switching transistor of the inverter 4.

At first, a controlling method is considered in a case that a capacitance of the capacitor 3 included within the controlling system of FIG. 1 is determined to be 0.

In FIG. 1, when the motor efficiency is represented by $\eta_M$, the main circuitry efficiency (efficiency of the rectification circuitry and inverter) is represented by $\eta_{INV}$, relationship of equation (6) is established between the inverter instantaneous input $P_1$ and motor instantaneous output $P_m$.

$$p_m = \eta_{INV} \cdot \eta_m \cdot p_1 \qquad \text{Equation (6)}$$

The motor instantaneous output $P_m$ can be expressed as equation (7) using the motor speed $\omega_m$ and torque $\tau_m$.

$$p_m = \omega_m \tau_m \qquad \text{Equation (7)}$$

The inverter instantaneous input $P_1$ can be expressed as equation (8) using the assumption that the power factor is 100%, power voltage $v_1$ and power current $i_1$.

$$p_1 = v_1 \cdot i_1 = 2 \cdot V_1 \cdot I_1 \cdot \sin^2(\omega_1 \cdot t) \ v_1 = \sqrt{2} \cdot V_1 \cdot \sin(\omega_1 \cdot t), \ i_1$$
$$\sqrt{2} \cdot I_1 \cdot \sin(\omega_1 \cdot t) \qquad \text{Equation (8)}$$

Wherein, t represents a time, $\omega_1$ represents power source angular frequency, $V_1$ and $I_1$ represent effective values of the power voltage and power current, respectively.

Wherein, the motor efficiency $\eta_M$ and the main circuitry efficiency $\eta_{INV}$ change depending upon the waveform controlling method of the inverter and the motor output, but they are constant at each operation point. Each efficiency value is supposed to be 100% for simplifying equations in the following discussion. Further, the speed of rotation $\omega_{1m}$ of the motor is supposed to be constant, and when the motor torque can be controlled so as to change the motor torque at a frequency which is twice of the power frequency, based upon equation (9) by equations (6) to (8), the inverter power current becomes a sine-wave (waveform without distortion), and controlling of the power factor of 100% is realized.

$$\tau_m = T_m \cdot \sin^2\theta_1 = \frac{1}{2} \cdot T_m \cdot (1 - \cos 2\theta_1) \quad \text{Equation (9)}$$

Wherein, $\theta_1 = \omega_1' \cdot t$

When the torque controlling of a motor is carried out based upon the equation (9), velocity ripple is generated following the torque ripple at a frequency which is twice of power frequency. But, the amplitude of the velocity ripple becomes smaller to a value which can be ignored due to inertia effect when the motor rotates at a high speed.

As an example, a trial calculation is made for a case that moment of inertia of a compressor mechanism and motor: $0.5 \times 10^{-3}$ kgm$^2$, and the power frequency is 50 Hz, the amplitude of the velocity ripple becomes 1 rps under the average torque of 2 Nm (that is, torque ripple amplitude $T_m/2=2$ Nm). When the speed of rotation of the motor is controlled to be 60 rps, the velocity ripple was about 1.6%. From the above, it is confirmed that the speed can be assumed to be constant.

On the other hand, distortion in power current is generated due to the capacitor current $i_c$ given by the equation (5) when the capacitance of the capacitor is not 0 and when controlling is made only as the equation (9).

To dissolve this disadvantage, it is sufficient that a filter for removing the capacitor current $i_c$ when the controlling is carried out based upon the equation (9). In this case, effectively limiting is carried out by the filter so as to remove (suppress) the capacitor current $i_c$.

When the distortion in the power current is dissolved by the controlling, it is sufficient that the motor torque or the motor speed is controlled so as to suppress the capacitor current $i_c$ overlapped to the power current.

Following two construction methods for controlling can be thought.

a) a method for calculating an ideal power current $i_1'$ based upon the equations (6) to (8) which flows when the capacitance of the capacitor is 0, when the torque of the equation (9) is generated, and for feedback controlling so as to follow the detection value of the power current $i_1$ to the calculation result;

b) a method for determine the torque or current for torque so as to allow a current to flow which is in reversed phase with respect to the capacitor current $i_c$, and for feed-forward controlling.

Hereinafter, description is made in detail for an embodiment for a case that a torque is controlled.

Figure 2:
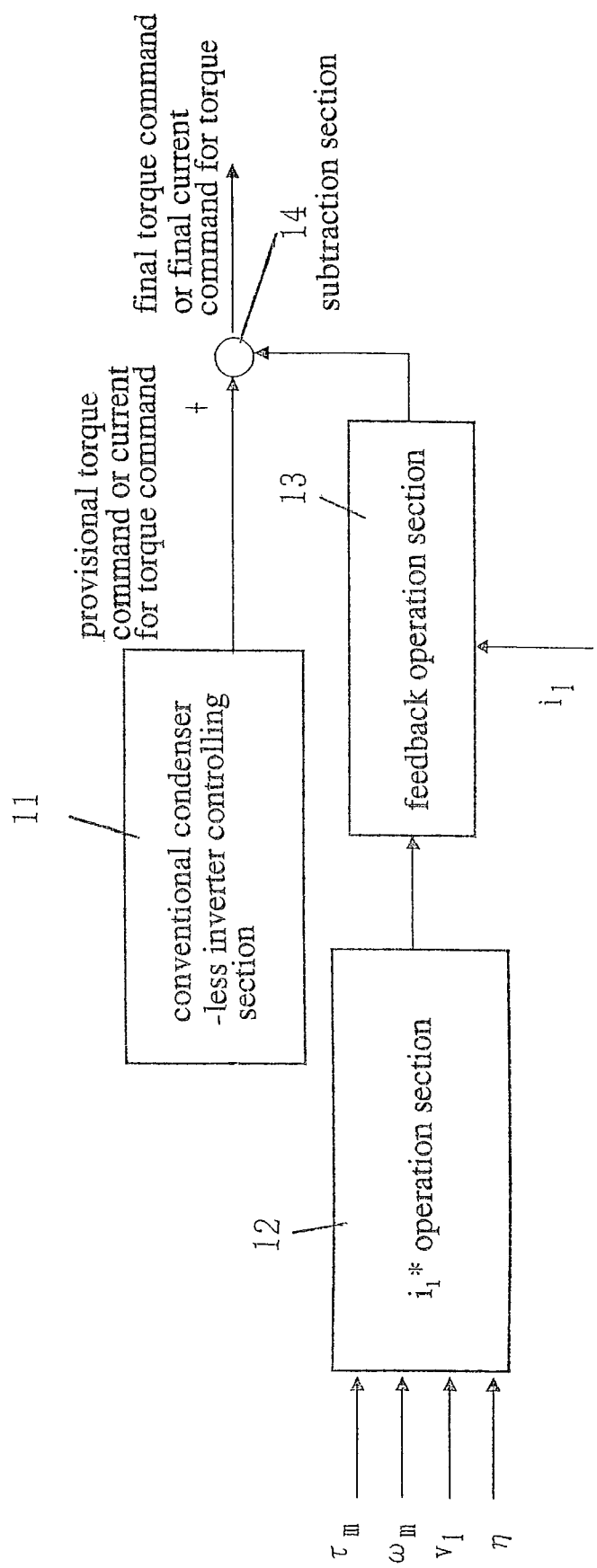
FIG. 2 is a block diagram illustrating a main section of an inverter controlling apparatus of an embodiment according to the present invention.

FIG. 2 is a block diagram illustrating a main section of an inverter controlling apparatus of an embodiment according to the present invention. This inverter controlling apparatus carries out feedback controlling.

This inverter controlling apparatus comprises a conventional condenser-less inverter controlling section 11, $i_1^*$ operation section 12, feedback operation section 13, and subtraction section 14. The conventional condenser-less inverter controlling section 11 outputs provisional torque command or current for torque command for controlling a conventional condenser-less inverter. The $i_1^*$ operation section 12 receives a motor torque $\tau_m$, motor rotational speed $\omega_m$, power voltage $v_1$, and coefficient $\eta$ as inputs, calculates a power current $i_1$ by carrying out operation of equation (10), and outputs the power current $i_1$ as power current command value $i_1^*$. The feedback operation section 13 receives the power current command value $i_1^*$ and the real current $i_1$ as inputs, carries out operation so as to make the deviation between the both to be 0 (for example, PI operation), and outputs the torque command for correction or current for torque command for correction. The subtraction section 14 subtracts the torque command for correction or current for torque command for correction which is output from the feedback operation section 13 from the provisional torque command or current for torque command which is output from the conventional condenser-less inverter controlling section 11, and obtains a final torque command or final current command for torque.

$$i_1^* = \frac{\tau_m \cdot \omega_m}{v_1 \cdot \eta} = \frac{T_m}{V_{\max} \cdot \eta} \cdot \sin\theta_1 \quad \text{Equation (10)}$$

Operation of the inverter controlling apparatus having the above arrangement is as follows.

The power current $i_1$ becomes the equation (10) using the equations (6) to (8), when the controlling is carried out so as to be the torque of the equation (9). It is determined to be the power current command value $i_1^*$. The torque command for correction or current for torque command for correction is obtained by carrying out controlling (for example, PI controlling) for malting the difference between the power current command value $i_1^*$ and the real current $i_1$ to be 0. Using this, the provisional torque command or current for torque command is corrected, so that the torque or current for torque is controlled for suppressing the capacitor current. Consequently, distortion in power current can be reduced.

In the equation (10), the coefficient $\eta$ is a constant for taking the main circuitry efficiency, motor efficiency and power factor into consideration. For determining the distortion to be 0, the coefficient $\eta$ may be changed in response to the load torque or rotational speed. For simplifying the controlling operating processing, driving condition of applied devices are taken into consideration so that the value at typical load condition is on behalf of.

Figure 3:
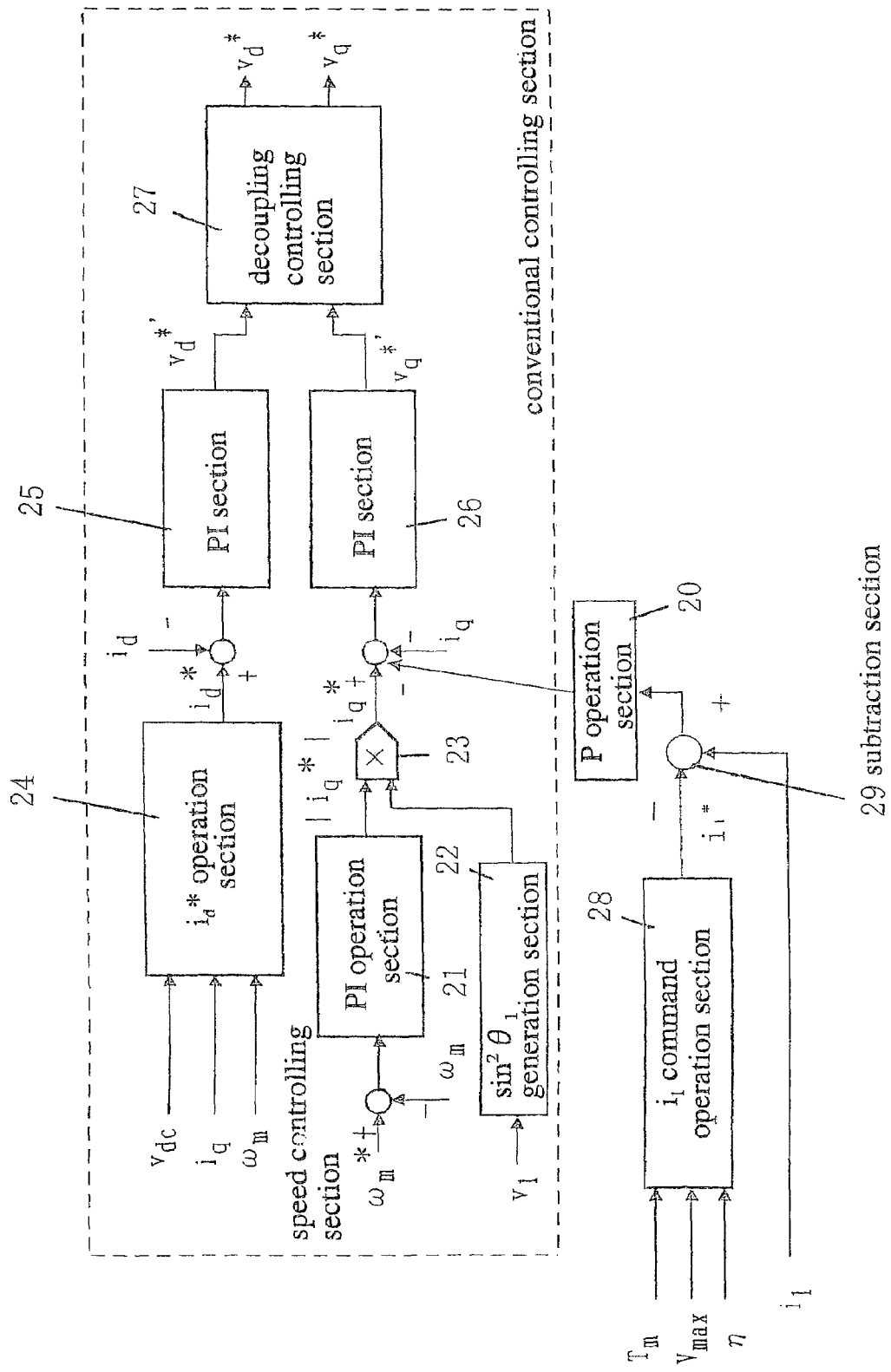
FIG. 3 is a block diagram illustrating an inverter controlling apparatus of another embodiment according to the present invention.

FIG. 3 is a block diagram illustrating an inverter controlling apparatus of another embodiment according to the present invention.

This inverter controlling apparatus comprises a PI operation section 21, sin$^2 \theta_1$ generation section 22, multiplication section 23, $i_d^*$ operation section 24, PI sections 25 and 26 for d-axis and q-axis, and decoupling controlling section 27. The PI operation section 21 receives a deviation between the speed command $\omega_m^*$ and the motor real speed $\omega_m$ as an input, and outputs a value of $|i_q^*|$ which is obtained by carrying out the PI operation (proportion and integration operation). The sin$^2 \theta_1$ generation section 22 receives the power voltage $v_1$ as an input, and outputs a signal sin$^2 \theta_1$ which is in synchronism with the power voltage $v_1$. The multiplication section 23 obtains a product of the signal sin$^2 \theta_1$ and the value $|i_q^*|$, and outputs the product as the q-axis current command $i_q^*$. The $i_d^*$ operation section 24 receives the DC voltage $V_{dc}$, q-axis current $i_q$ and motor real speed $\omega_m$ as inputs, and outputs a d-axis current command $i_d^*$ which is obtained by carrying out the operation of the equation (2). The PI sections 25 and 26 for d-axis and q-axis receive the deviations between the dq-axis current commands $i_d^*$ and $i_q^*$ and the dq-axis real currents $i_d$ and $i_q$, as inputs, and output first dq-axis voltage commands $v_d^{*'}$ and $v_q^{*'}$ which are obtained by carrying out the PI operations. The decoupling controlling section 27 receives the first dq-axis voltage commands $v_d^{*'}$ and $v_q^{*'}$ as inputs and outputs second dq-axis voltage commands $v_d^*$ and $v_q^*$ which are obtained by carrying out the operation of the equation, (3). The above arrangement is similar to the arrangement of a conventional inverter controlling apparatus.

And, the inverter controlling apparatus of FIG. 3 further comprises an $i_1$ command operation section 28, subtraction section 29, and P operation section 20. The $i_1$ command operation section 28 receives the average torque $T_m$, maximum value $V_{max}$ of the DC voltage and the coefficient $\eta$ as inputs, and outputs a power current command value $i_1^*$ which is obtained by carrying out the operation of the equation (10). The subtraction section 29 subtracts the power current command value $i_1^*$ from the real current $i_1$. The P operation section 20 receives the output from the subtraction section 29, and outputs a q-axis current for correction which is obtained by carrying out the P operation. The deviation between the q-axis current command $i_q^*$ and the q-axis real current $i_q$, is subtracted by the q-axis current for correction, and the subtraction result is supplied to the PI operation section 26.

Therefore, even when this inverter controlling apparatus is employed, current for torque can be controlled for suppressing capacitor current. Distortion in power current can also be decreased.

Figure 4:
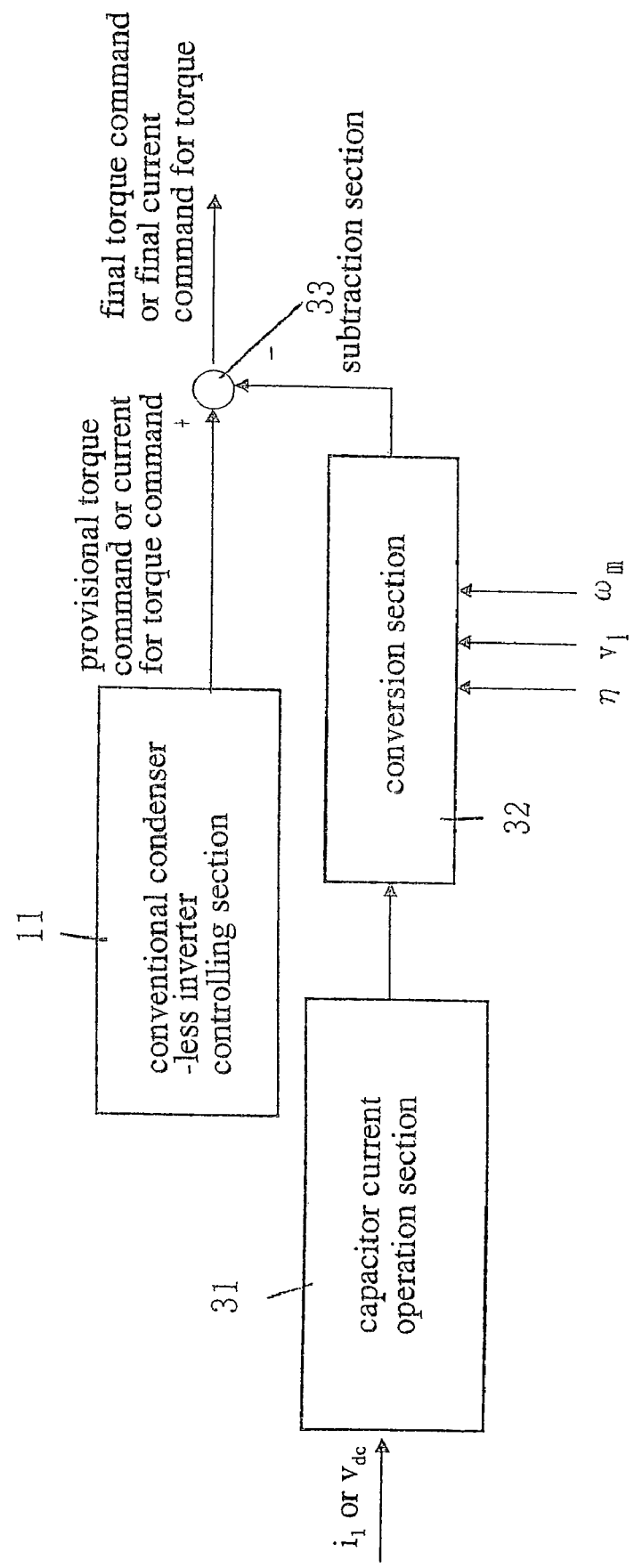
FIG. 4 is a block diagram illustrating a main section of an inverter controlling apparatus of a further embodiment according to the present invention.

FIG. 4 is a block diagram illustrating a main section of an inverter controlling apparatus of a further embodiment according to the present invention. This inverter controlling apparatus is an apparatus which carries out feed-forward controlling.

This inverter controlling apparatus comprises a conventional condenser-less inverter controlling section 11 for outputting a provisional torque command or provisional current for torque for controlling a conventional condenser-less inverter, a capacitor current operation section 31, conversion section 32, and subtraction section 33. The capacitor current operation section 31 receives the power current $i_1$ and DC voltage $v_{dc}$ as inputs, and carries out operation so as to obtain a capacitor current $i_c$. The conversion section 32 receives the capacitor current $i_c$, coefficient $\eta$, power voltage $V_1$, and rotational speed $\omega_m$ of the motor as inputs, and transforms the capacitor current $i_c$ into a torque command or current command for torque for correction. The subtraction section 33 subtracts the torque command or current command for torque for correction output from the conversion section 32 from the provisional torque command or provisional current for torque output from the conventional condenser-less inverter controlling section 11, so that a final torque command or final current command for torque is obtained.

Operation of the inverter controlling apparatus is as follows.

When the feed-forward controlling is carried out, it is sufficient that the equation (9) is rewritten as an equation (11), and that a torque $\tau_c$ is overlapped to the torque command, the being in phase which torque $\tau_c$ is reverse to that of the capacitor current $i_c$.

$$\tau_m = T_m \cdot \sin^2 \theta_1 + \tau_c \qquad \text{Equation (11)}$$

Wherein, the torque $\tau_c$ is sufficient to be a torque which is expressed by an equation (12) which is based upon the equations (6) to (8).

$$\tau_c = -\frac{\text{sign}(v_1) \cdot v_1 \cdot i_c}{\omega_m} \cdot \eta = -\frac{|v_1| \cdot i_c}{\omega_m} \cdot \eta \qquad \text{Equation (12)}$$

More specifically, when the capacitance of the capacitor is not 0, the power current $i_1$ can be expressed as an equation (13).

$$i_1 = i_1' + i_c * \text{sign}(v_1) \qquad \text{Equation (13)}$$

Wherein, $i_1'$ represents the power current when the capacitance of the capacitor is 0, and is given by the equation (10). Further, sign( ) is a function which returns a sign.

Torque becomes the equation (12) from the relationship between the equation (6) and the equation (7), the torque negating the power item including the capacitor current $i_c$ among results obtained by substituting the equation (13) for the equation (8).

Wherein, the coefficient $\eta$ is a constant for taking account of main circuitry efficiency, motor efficiency, and power factor. The constant may be changed for determining distortion to be none, responding to the load torque and rotational speed. For simplification in the controlling and operating processing, the constant may be represented with a value at a typical load condition by taking a driving condition of an application device into consideration, for example.

Then, a case is described by talking an IPM motor disclosed in the Article 2 as an example, in which case a torque is controlled using current controlling. A torque $\tau_m$ of an IPM motor is represented by an equation (14).

$$\tau_m = n \cdot (\lambda_a + (L_d - L_q) \cdot i_d) \cdot i_q \qquad \text{Equation (14)}$$

The item of $(L_d - L_q) \cdot i_d$ in the equation (14) changes depending upon the d-axis current. When the assumption is made for simplification that the change width og the d-axis current is small and that the torque is in proportion to the d-axis current, the q-axis current command $i_q^*$ {refer to equation (15)} is obtained from the equation (9) and the equation (14).

$$i_q^* = |i_q^*| \cdot \sin^2 \theta_1 \qquad \text{Equation (15)}$$

On the other hand, in the contrary, the inverter controlling apparatus calculates the q-axis current command $i_q^*$ based upon an equation (16) which is obtained from the equation (11) using the equation (14).

$$i_q^* = |i_q^*| \cdot \sin^2 \theta - \frac{v_1 \cdot i_c}{\omega_m} \cdot \eta \cdot \frac{1}{n \cdot (\lambda_a + (L_d - L_q) \cdot I_{d0})} \qquad \text{Equation (16)}$$

The second item in the equation (16) represents the current for torque for compensating the capacitor current. Further, $I_{do}$ represents a moving average value of the d-axis current for about ½ to 10 cycles of the power waveform.

Therefore, the current for torque can be controlled for suppressing the capacitor current. And, the distortion in the power current can be reduced.

In FIG. 4, the arrangement is employed in which the capacitor current $i_c$ is calculated from the detection value of the power current $i_1$ or DC voltage $v_{dc}$. But, an arrangement may be employed in which a current sensor is provided for directly detecting the capacitor current $i_c$, and the detection value is directly supplied to the conversion section 32.

Figure 5:
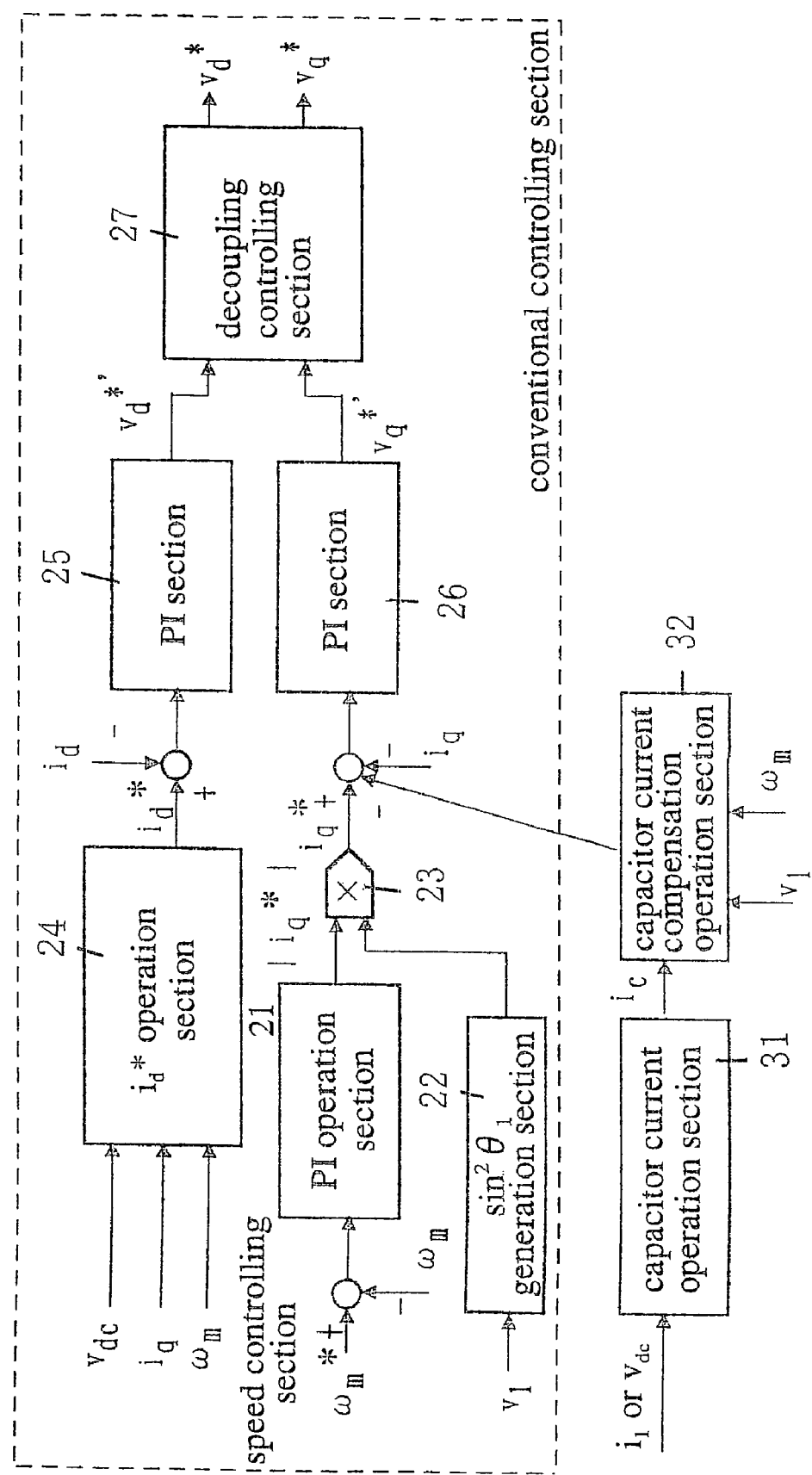
FIG. 5 is a block diagram illustrating an inverter controlling apparatus of a further embodiment according to the present invention.

FIG. 5 is a block diagram illustrating an inverter controlling apparatus of a further embodiment according to the present invention.

This inverter controlling apparatus differs from the inverter controlling apparatus of FIG. 3 in that a capacitor current operation section 31 and capacitor current compensation operation section 32' are employed instead the $i_1$ command operation section 28, subtraction section 29 and P operation section. The capacitor current operation section 31 receives the power current $i_1$ or DC voltage $v_{dc}$ as an input and carries out the operation for obtaining the capacitor current $i_1$. The capacitor current compensation operation section 32' receives the capacitor current $i_c$, power voltage $v_1$ and motor rotational speed $\omega_m$ as inputs, and converts the capacitor current $i_c$ into the torque command for correction or current for torque command for correction.

Therefore, in this inverter controlling apparatus, the current for torque can be controlled for suppressing the capacitor current, and the distortion in the power current can be reduced.

Figure 6:
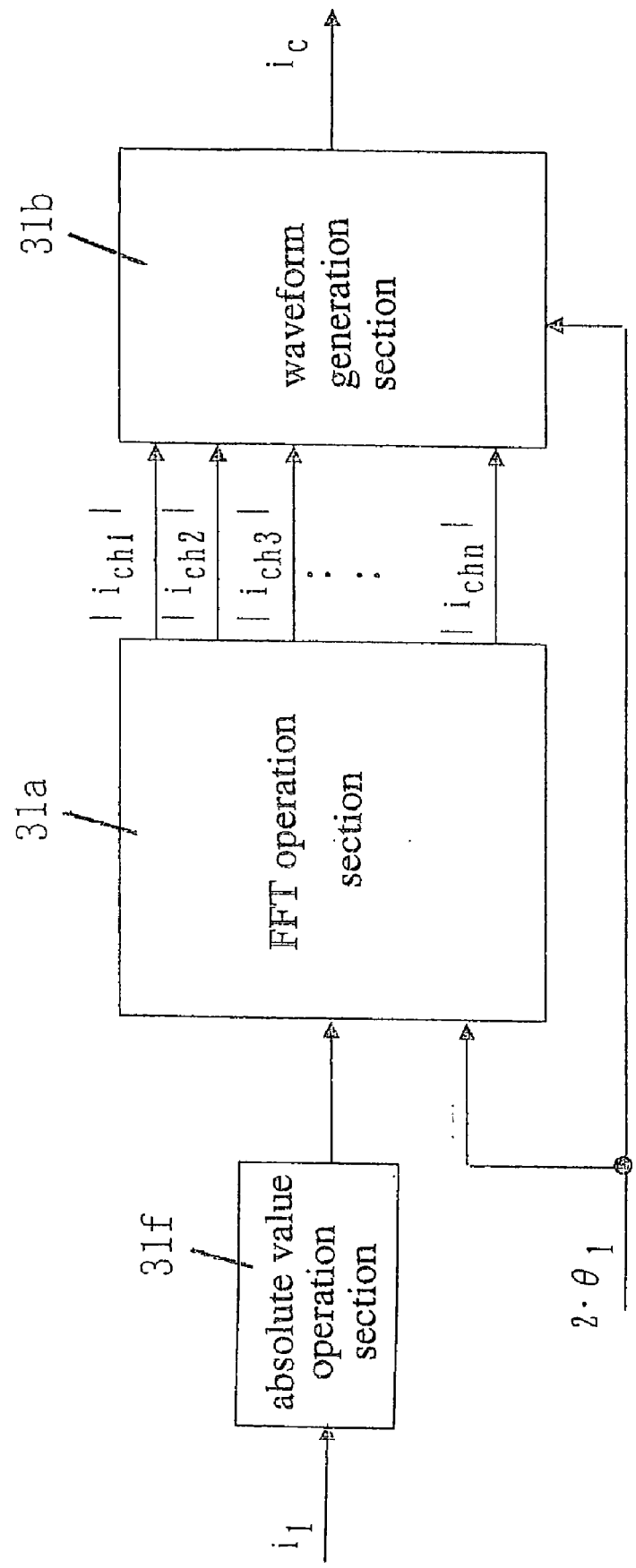
FIG. 6 is a block diagram illustrating a main section of an inverter controlling apparatus of a further embodiment according to the present invention.

FIG. 6 is a block diagram illustrating a main section of an inverter controlling apparatus of a further embodiment according to the present invention.

In this inverter controlling apparatus, an FFT (harmonics analysis) operation section 31a and waveform generation section 31b constitute the capacitor current operation-section 31 in FIG. 5.

Figure 25:
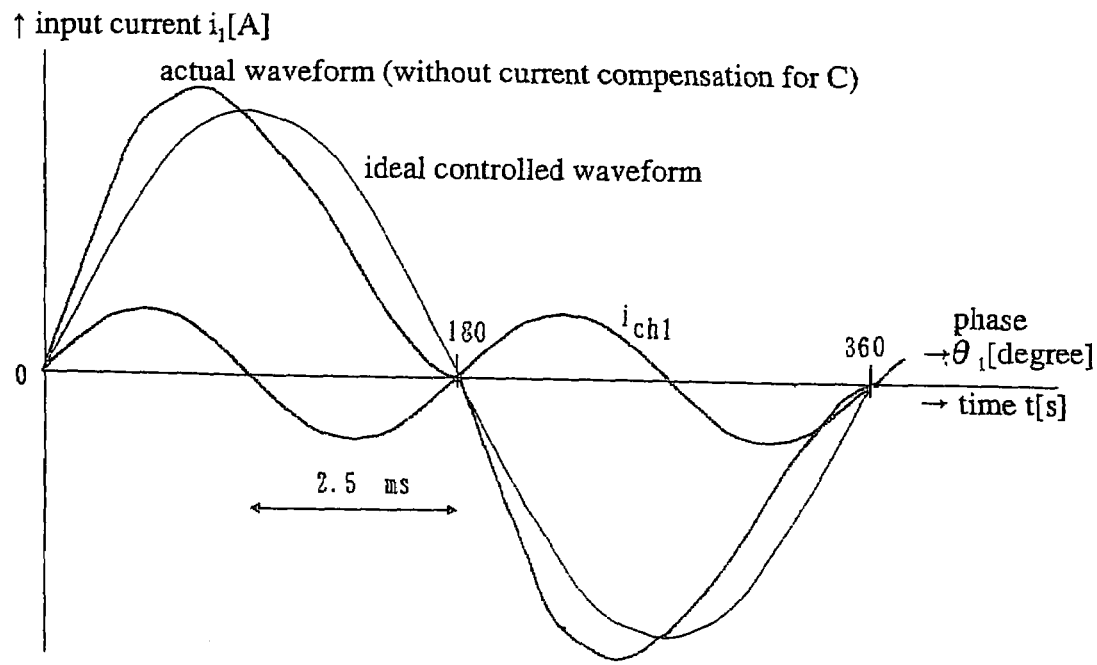
FIG. 25 is a diagram illustrating a power current when the condenser-less inverter circuitry is controlled.

The FFT operation section 31a receives the absolute value $|i_1|$ of the power current calculated by an absolute value operation section 31f and the absolute value phase $\theta_2$ (=2·$\theta_1$) ($\theta_2$ is determined its 0 phase to be at a peak point of the absolute value $|v_1|$ of the power voltage as is illustrated in FIG. 25) as inputs, carries out the FFT operation, and outputs amplitude components $|i_{ch1}|$, $|i_{ch2}|$, ···of the harmonics $i_{ch1}$, $i_{ch2}$, ···which are in-phase of —sin $\theta_2$ corresponding to the capacitor current $i_c$. The waveform generation section 31b receives the amplitude components $|i_{ch1}|$, $|i_{ch2}|$, ···of the harmonics $i_{ch1}$, $i_{ch2}$, ···and the absolute value phase $\theta_2$ as inputs, and generates the capacitor current $i_c$ based upon an equation (17).

$$i_c = -|i_{ch1}|\cdot\sin\theta_2 - |i_{ch2}|\cdot\sin 2\theta_2 - |i_{ch3}|\cdot\sin 3\theta_2 \qquad \text{Equation (17)}$$

Therefore, when this inverter controlling apparatus is employed, the capacitor current $i_c$ can be calculated accurately, the current for torque can be controlled for suppressing the capacitor current, and the distortion in the power current can be reduced.

Figure 7:
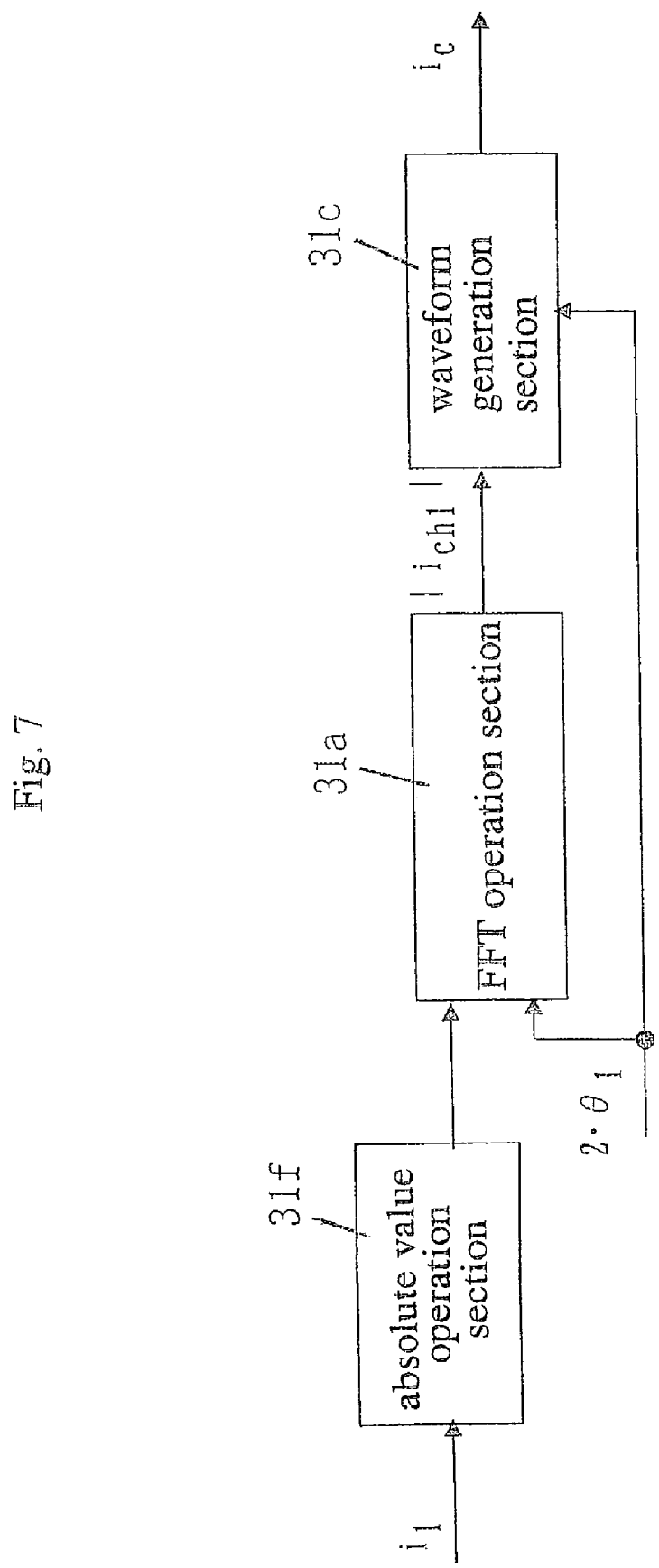
FIG. 7 is a block diagram illustrating a main section of an inverter controlling apparatus of a further embodiment according to the present invention.

FIG. 7 is a block diagram illustrating a main section of an inverter controlling apparatus of a further embodiment according to the present invention.

This inverter controlling apparatus differs from the inverter controlling apparatus of FIG. 6 in that a waveform generation section 31c is employed instead the waveform generation section 31b. The waveform generation section 31c receives only the amplitude components $|i_{ch1}|$ of the harmonics $i_{ch1}$, $i_{ch2}$, ···of twice frequency with respect to the power frequency and absolute value phase 2·$\theta_1$ of the power voltage, and generates the capacitor current $i_c$. Of course, a device for outputting only the twice frequency component with respect to the power frequency may be employed as the FFT operation section 31a.

As is understood from the equation (4), harmonic amplitude of the DC voltage $v_{dc}$ decreases following the increase in harmonic order n. Therefore, the capacitor current $i_c$ can be generated with considerably high accuracy even when the order is determined to be only the twice frequency with respect to the power frequency, the order being applied the FFT, as is illustrated in FIG. 7. Therefore, when this inverter controlling apparatus is employed, the operation load can be greatly reduced, the capacitor current $i_c$ can be calculated accurately, the current for torque can be controlled for suppressing the capacitor current, and the distortion in the power current can be reduced.

Figure 8:
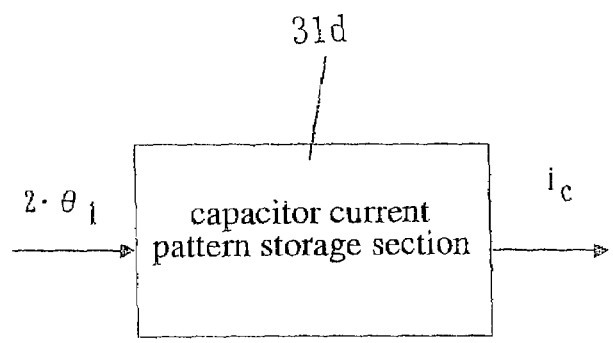
FIG. 8 is a block diagram illustrating a main section of an inverter controlling apparatus of a further embodiment according to the present invention.

FIG. 8 is a block diagram illustrating a main section of an inverter controlling apparatus of a further embodiment according to the present invention.

This inverter controlling apparatus differs from the inverter controlling apparatus of FIG. 6 in that a capacitor current pattern storage section 31d is employed instead the FFT operation section 31a and waveform generation section 31b.

The capacitor current pattern storage section 31d stores previously operated capacitor current is based upon the equation (5), and carries out looking-up operation based upon the absolute value phase 2·$\theta_1$ of the power voltage.

Therefore, the operation load can be minimized, the capacitor current $i_c$ can be calculated accurately, the current for torque can be controlled for suppressing the capacitor current, and the distortion in the power current can be reduced.

Figure 9:
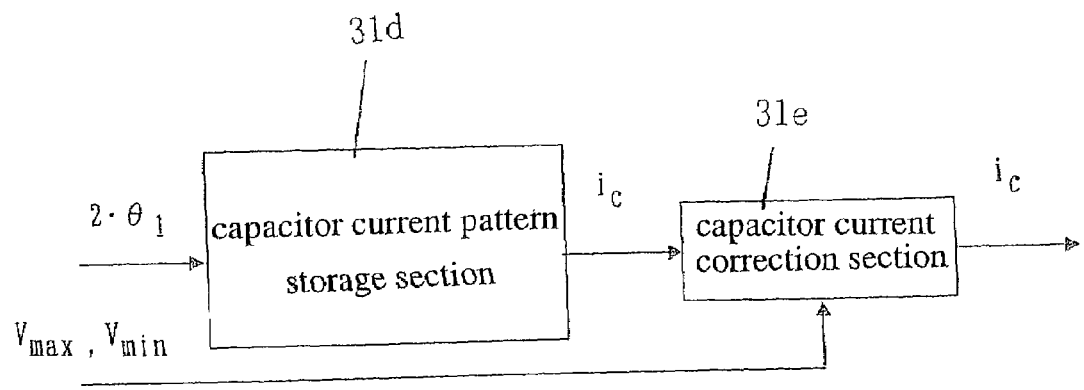
FIG. 9 is a block diagram illustrating a main section of an inverter controlling apparatus of a further embodiment according to the present invention.

FIG. 9 is a block diagram illustrating a main section of an inverter controlling apparatus of a further embodiment according to the present invention.

This inverter controlling apparatus differs from the inverter controlling apparatus of FIG. 8 in that a capacitor current correction section 31e is further included. The capacitor current correction section 31e receives the capacitor current $i_c'$ output from the capacitor current pattern storage section 31d, and the difference between the maximum value $V_{max}$ and the minimum value $V_{min}$ of the DC voltage $v_{dc}$ as inputs, carries out an operation of an equation (18), and corrects the capacitor current.

$$i_c = \frac{V_{max} - V_{min}}{V_{max}} \cdot i_c' \qquad \text{Equation (18)}$$

Operation of the inverter controlling apparatus having this arrangement is described with reference to FIG. 10.

FIG. 10(A) illustrates a waveform of the DC voltage $v_{dc}$ when the minimum value of the DC voltage $v_{dc}$ is determined to be $v_{min}$ by the field controlling, while FIG. 10(B) illustrates a waveform of the DC voltage $V_{dc}$ when load is light.

Figure 10:
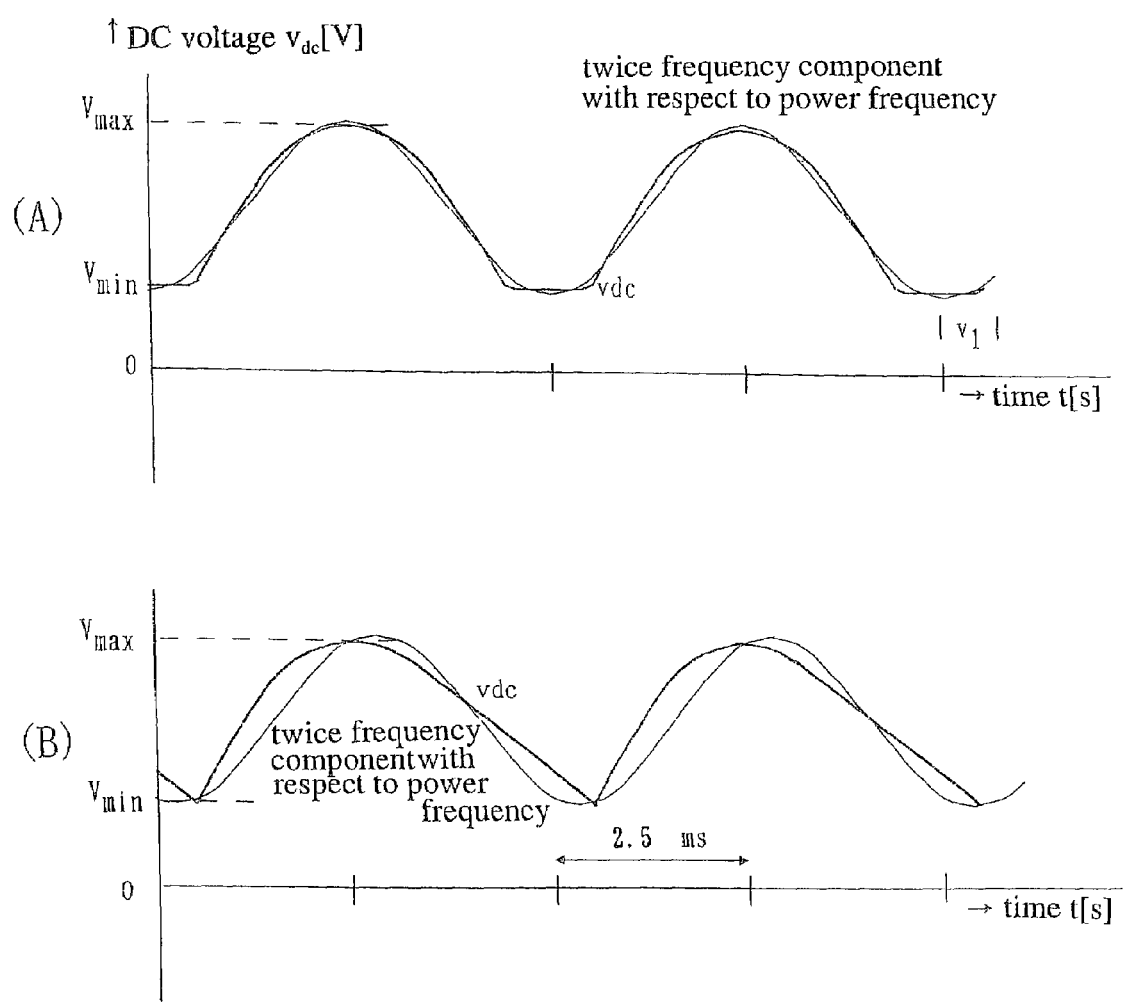
FIG. 10 are diagrams illustrating a waveform of a DC voltage $V_{dc}$ when the minimum value of a DC voltage $V_{dc}$ is determined to be $V_{min}$ by the field controlling, and a waveform of a DC voltage $V_{dc}$ when light-load is applied.

That is, an amplitude of harmonic component of the DC voltage $v_{dc}$ changes depending upon load and controlling condition, as is understood from FIG. 10.

In the inverter controlling apparatus of FIG. 9, the capacitor current is corrected by carrying out the operation of the equation (18) by the capacitor current correction section 31e. Therefore, the capacitor current can be obtained with accuracy and with simple operation despite the load and controlling condition, the current for torque can be controlled for suppressing the capacitor current, and the distortion in the power current can be reduced.

Figure 11:
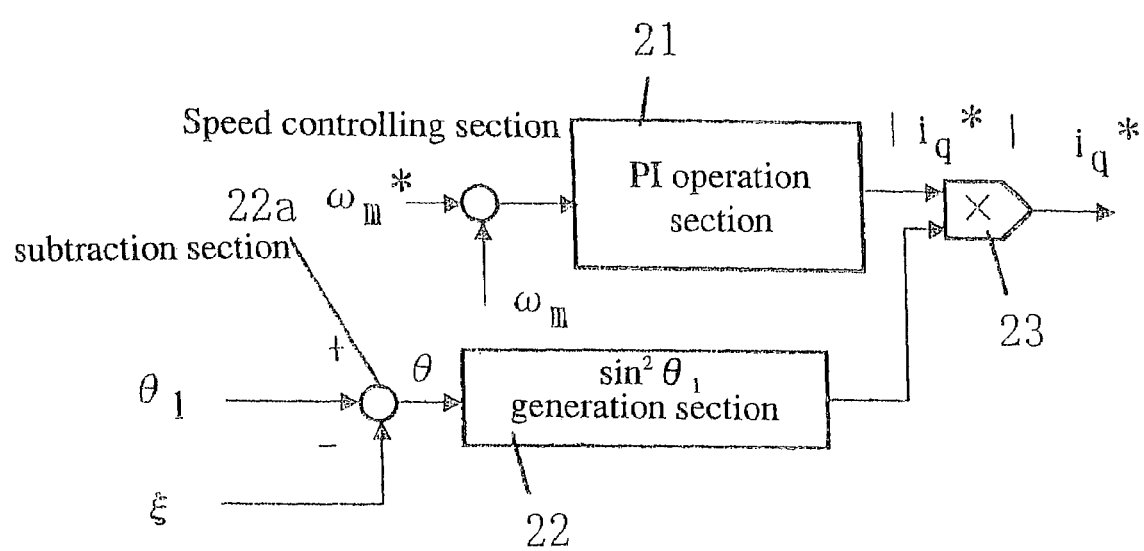
FIG. 11 is a block diagram illustrating a main section of an inverter controlling apparatus of a further embodiment according to the present invention.

FIG. 11 is a block diagram illustrating a main section of an inverter controlling apparatus of a further embodiment according to the present invention.

This inverter controlling apparatus differs from the inverter controlling apparatus of FIGS. 3 and 5 in that a subtraction section 22a is further included. The subtraction section 22a subtracts the phase ξ for correction (q-axis current phase command) from the phase $\theta_1$ of the power voltage so as to obtain a corrected phase θ, and supplies the corrected phase θ to the sin² θ generation section 22.

Operation of the inverter controlling apparatus having this arrangement is as follows.

When θ is small, cos θ is approximated to be 1, and sin θ is approximated to be 0. Therefore, relationship of an equation (19) is obtained.

$$\sin^2(\theta_1+\xi)=\sin^2\theta_1-\xi\cdot\sin 2\theta_1 \quad \text{Equation (19)}$$

The second item of the equation (19) becomes opposite phase of the capacitor current $i_c$ when ξ is determined to be delay phase, that is negative, and its amplitude can be controlled based upon the magnitude |ξ| of the q-axis current phase command.

Therefore, the capacitor current $i_c$ can be compensated more easily, by employing the arrangement of FIG. 11.

Figure 12:
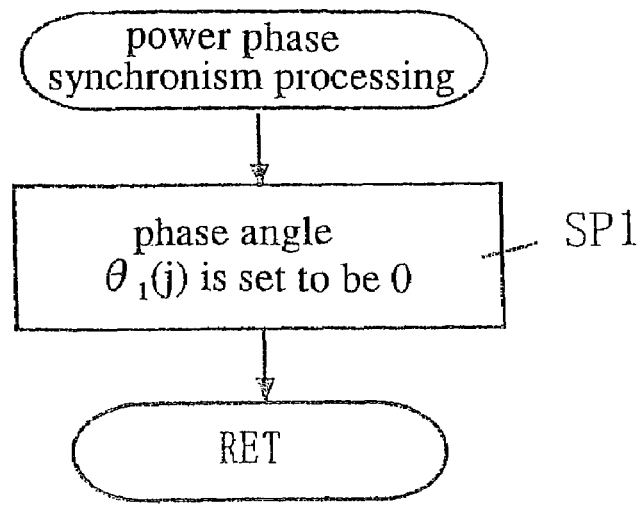
FIG. 12 is a flowchart describing power source phase synchronism processing.

FIG. 12 is a flowchart explaining power phase synchronism processing. The processing is started in response to the rising of the power voltage (rising of the zero-cross detection signal for the input voltage). In step SP1, a phase angle $\theta_1(j)$ is set to be 0. Then, the processing returns to the original processing. Herein and hereinafter, the suffix (j) is used to recognize a sample point.

Figure 13:
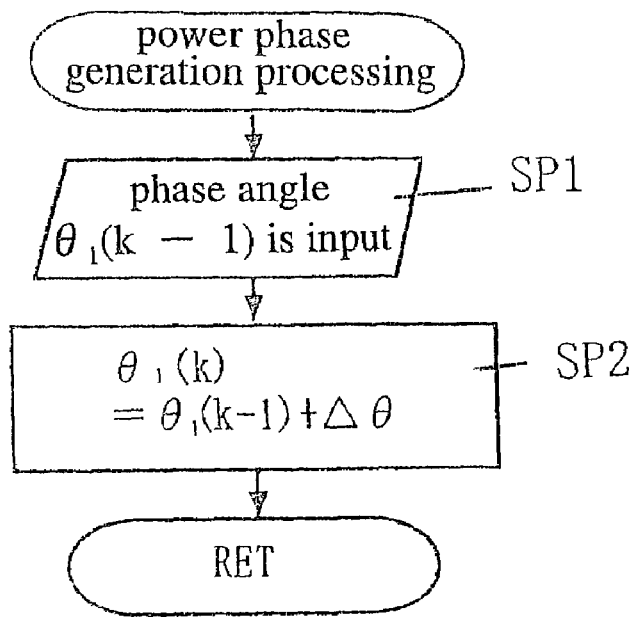
FIG. 13 is a flowchart describing power source phase generation processing.

FIG. 13 is a flowchart explaining power phase generation processing. The processing is started at predetermined interruption interval $T_s$. In step SP1, a phase angle $\theta_1(k-1)$ is input. In step SP2, a phase angle $\theta_1(k)$ at the present time is generated by carrying out the operation of $\theta_1(k)=\theta_1(k-1)+\Delta\theta$. Then, the processing returns to the original processing.

The constant Δθ is determined as follows, for example.

When the power frequency $f_1$=50 Hz, and when assumption is made that $\theta_1$=3600 is the power phase of 360° and that the interruption interval $T_s$ is 200 μs, Δθ $(=\theta_1 \cdot f_1 \cdot T_s)$ becomes 36.

Figure 14:
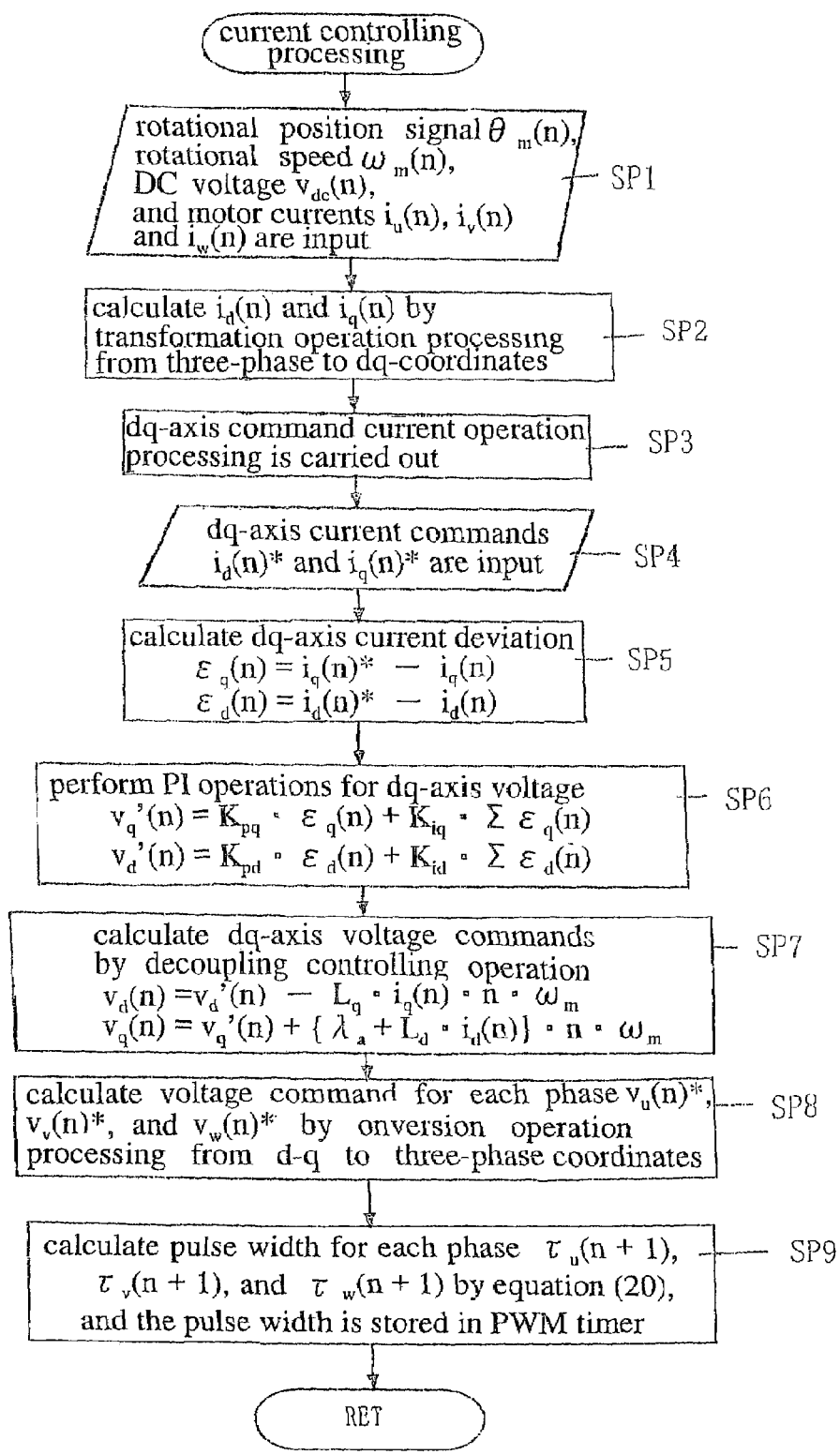
FIG. 14 is a flowchart describing current controlling processing.

FIG. 14 is a flowchart explaining current controlling processing. The processing is carried out at every predetermined interruption interval $T_s$.

In step SP1, the rotational position signal $\theta_m(n)$, rotational speed $\omega_m(n)$, DC voltage $v_{dc}(n)$, and motor currents $i_u(n)$, $i_v(n)$ and $i_w(n)$ are input (n is an integer which is incremented at every processing). In step SP2, transformation operation processing from three-phase to dq-coordinates is carried out so as to calculate the dq-axis currents $i_d(n)$ and $i_q(n)$. In step SP3, dq-axis command current operation processing is carried out. In step SP4, dq-axis current commands $i_d(n)^*$ and $i_q(n)^*$ are input. In step SP5, operations of $\epsilon_d(n)=i_d(n)^*-i_d(n)$ and $\epsilon_q(n)=i_q(n)^*-i_q(n)$ are carried out so as to calculate dq-axis current deviation $\epsilon_d(n)$ and $\epsilon_q(n)$. In step SP6, operations of $v_d'(n)=K_{pd}\cdot\epsilon_d(n)+K_{id}\cdot\Sigma\epsilon_d(n)$ and $v_q' K_{pq}\cdot\epsilon_q(n)+K_{iq}\cdot\Sigma\epsilon_q(n)$ are carried out so as to perform PI operations for dq-axis voltage. In step SP7, decoupling controlling operation of $[v_d(n) =v_d'(n)-L_q\cdot i_q(n)\cdot n\cdot\omega_m$ and $v_q(n)=v_q'(n)+\{\lambda_a+L_d\cdot i_d(n)\}\cdot n\cdot\omega_m]$ are carried out so as to calculate dq-axis voltage commands $v_d(n)$ and $v_q(n)$. In step SP8, conversion operation processing from d-q to three-phase coordinates is carried out so as to calculate voltage command for each phase $v_u(n)^*$, $v_v(n)^*$, and $v_w(n)^*$. In step SP9, operation of an equation (20) is carried out so as to calculate pulse width for each phase $\tau_u(n+1)$, $\tau_v(n+1)$, and $\tau_w(n+1)$, and to store the pulse width in a PWM timer. Then, operation returns to the original processing.

$$\tau_u(n+1)=[\{v_u(n)^*/v_{dc}(n)\}+\tfrac{1}{2}]\cdot T_c$$

$$\tau_v(n+1)=[\{v_v(n)^*/v_{dc}(n)\}+\tfrac{1}{2}]\cdot T_c$$

$$\tau_w(n+1)=[\{v_w(n)^*/v_{dc}(n)\}+\tfrac{1}{2}]\cdot T_c \quad \text{Equation (20)}$$

Next, the operation in step SP3 in FIG. 14 is described.

Figure 15:
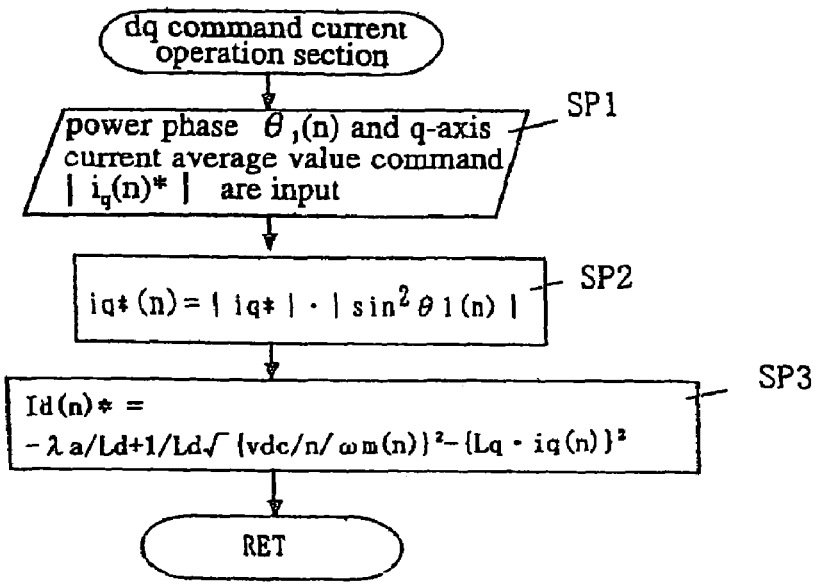
FIG. 15 is a flowchart describing an example of conventional processing of the step SP3 in FIG. 14.

FIG. 15 is a flowchart explaining a conventional operation in step SP3 in FIG. 14.

In step SP1, the power phase $\theta_1(n)$ and q-axis current average value command $|i_q(n)^*|$ are input. In step SP2, operation of $i_q(n)^*=|i_q(n)^*|\cdot\sin^2\theta_1(n)$ is carried out so as to calculate the q-axis current command $i_q(n)^*$. In step SP3, operation of $i_d(n)^*=-\lambda_a/L_d+(1/L_d)[\{v_{dc}\cdot n/\omega_m(n)\}^2-\{L_q\cdot i_q(n)\}^2]^{1/2}$ is carried out so as to calculate the d-axis current command $i_d(n)^*$. Then, operation returns to the original processing.

Therefore, compensation of the capacitor current cannot be carried out.

Figure 16:
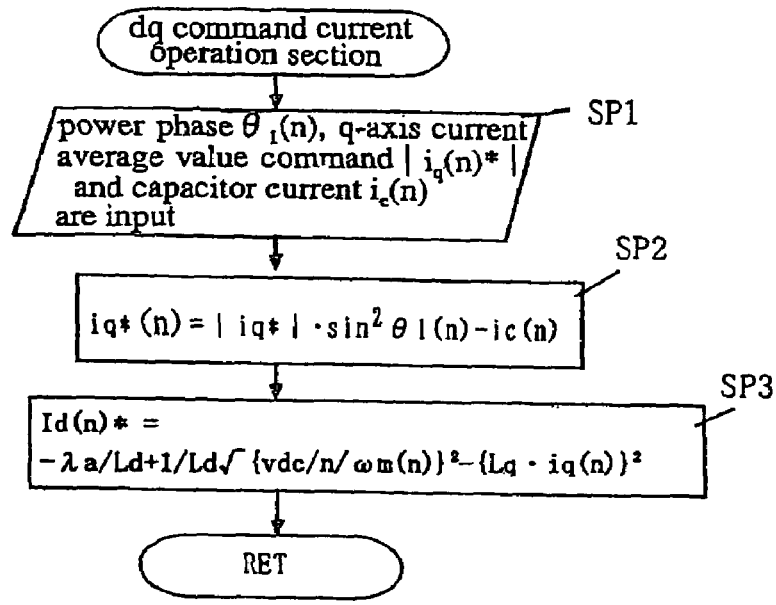
FIG. 16 is a flowchart describing an example of processing according to the present invention of the step SP3 in FIG. 14.
Figure 19:
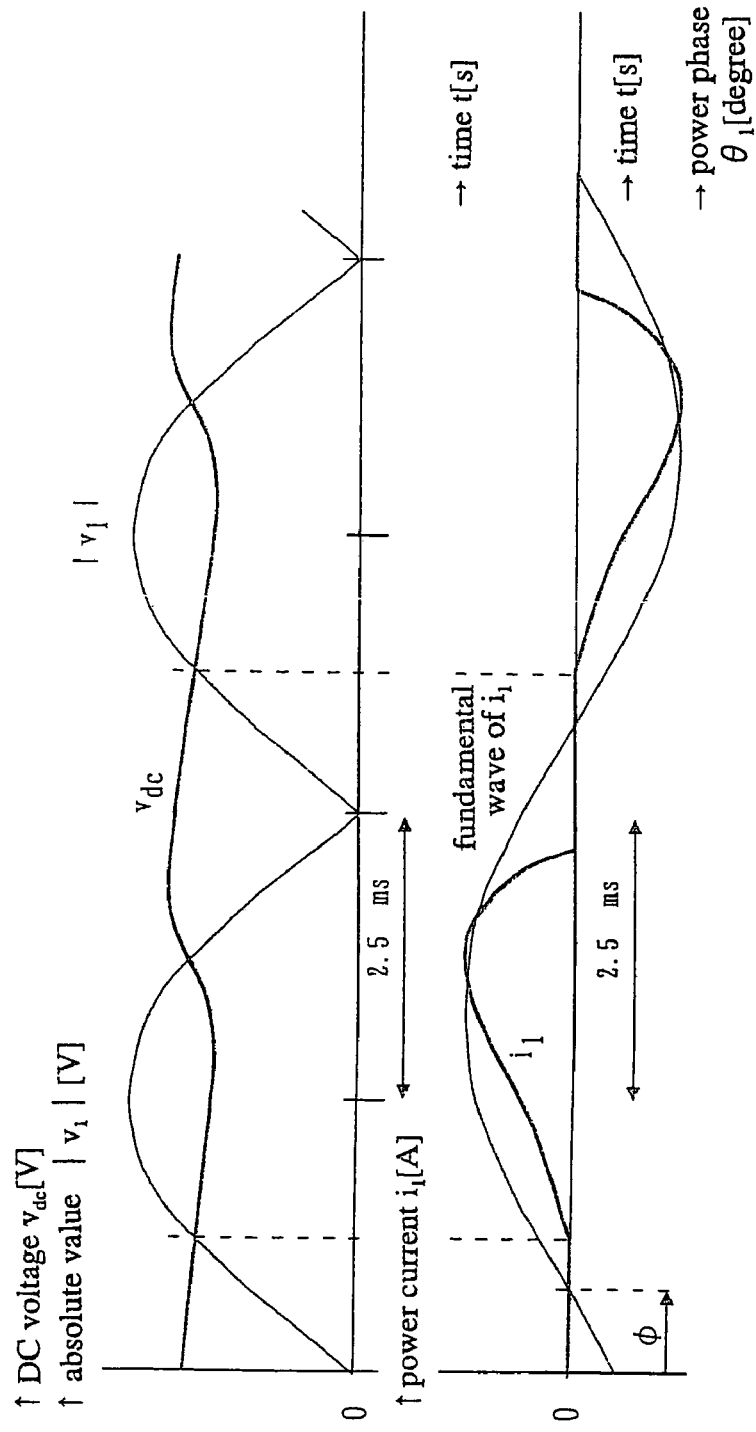
FIG. 19 is a diagram illustrating a DC voltage waveform and a power current waveform in the inverter circuitry of FIG. 18.
Figure 20:
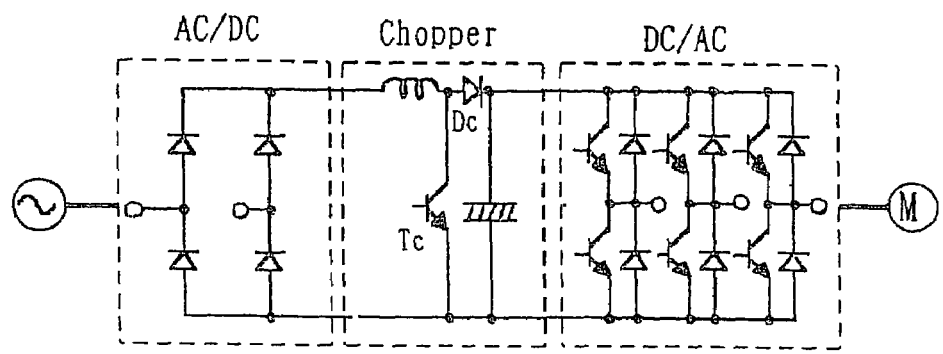
FIG. 20 is an electric circuitry diagram illustrating another example of an arrangement of a conventional inverter circuitry.
Figure 21:
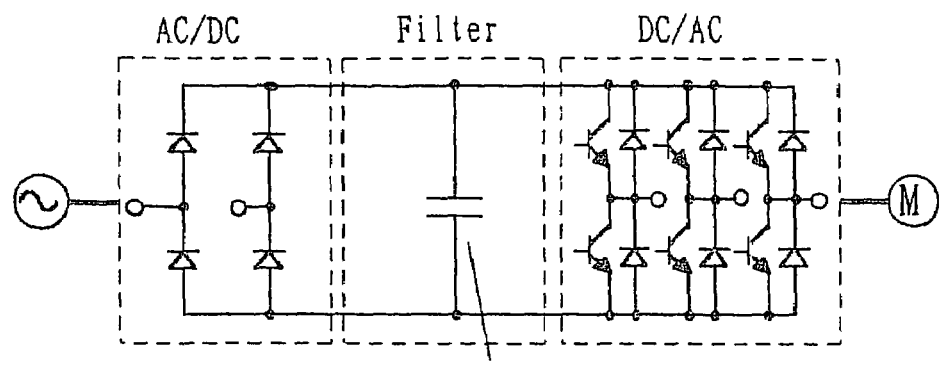
FIG. 21 is an electric circuitry diagram illustrating an arrangement of a conventional condenser-less inverter circuitry.
Figure 22:
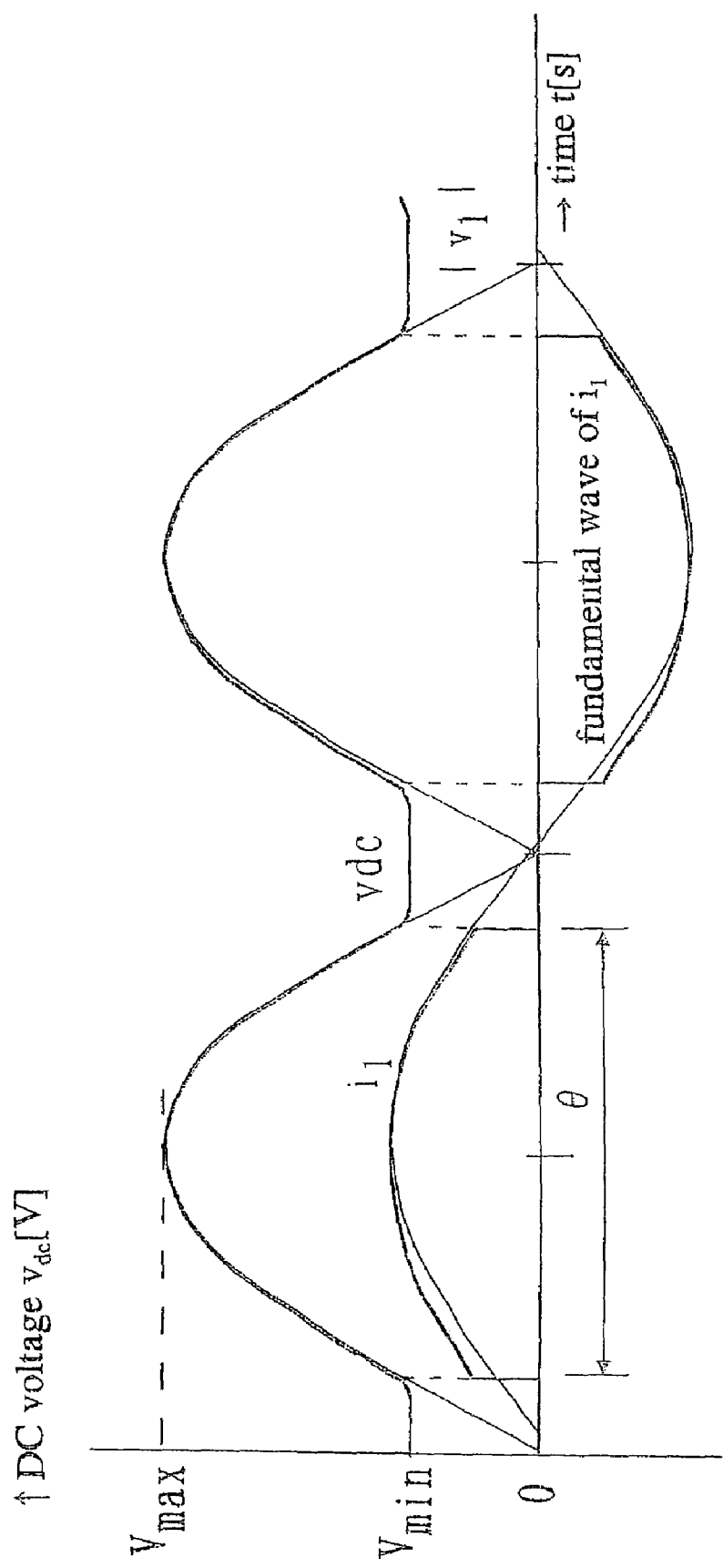
FIG. 22 is a diagram describing the controlling principal of the condenser-less inverter circuitry.
Figure 23:
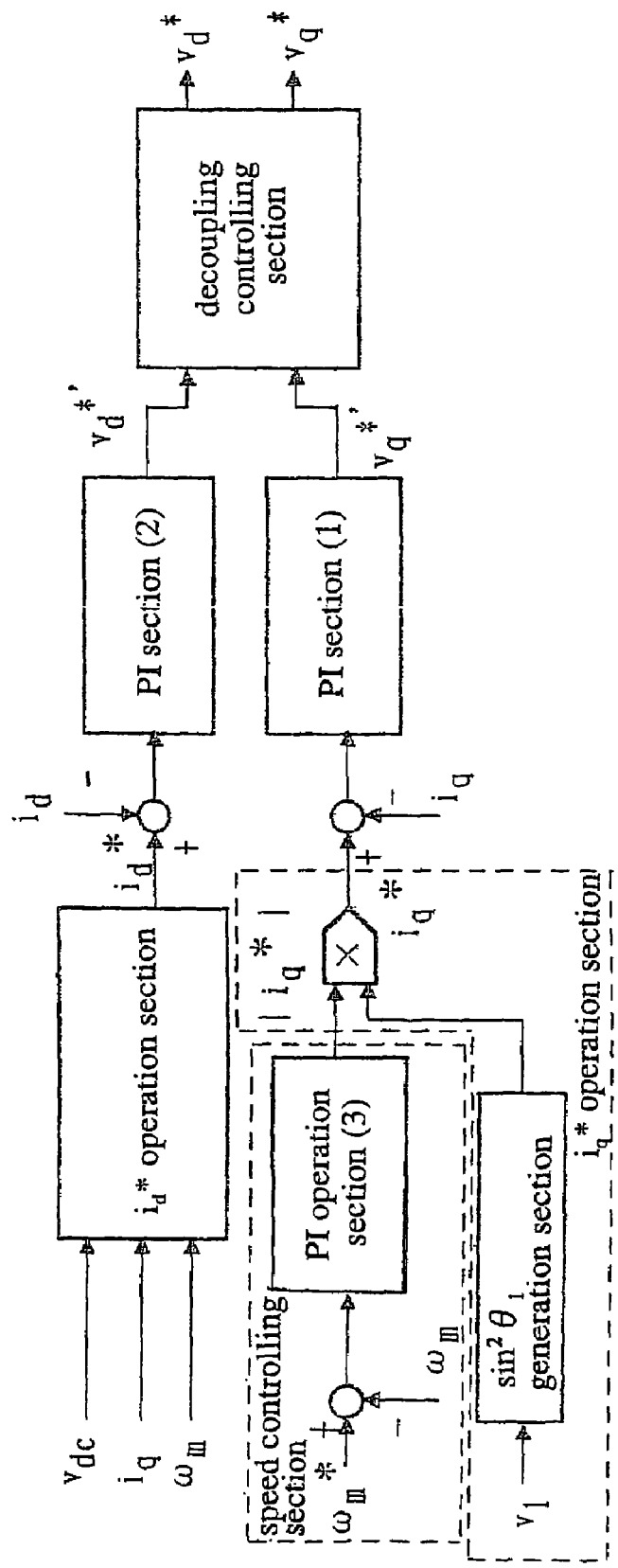
FIG. 23 is a block diagram illustrating an arrangement of an inverter controlling apparatus for controlling the conventional condenser-less inverter circuitry.
Figure 24:
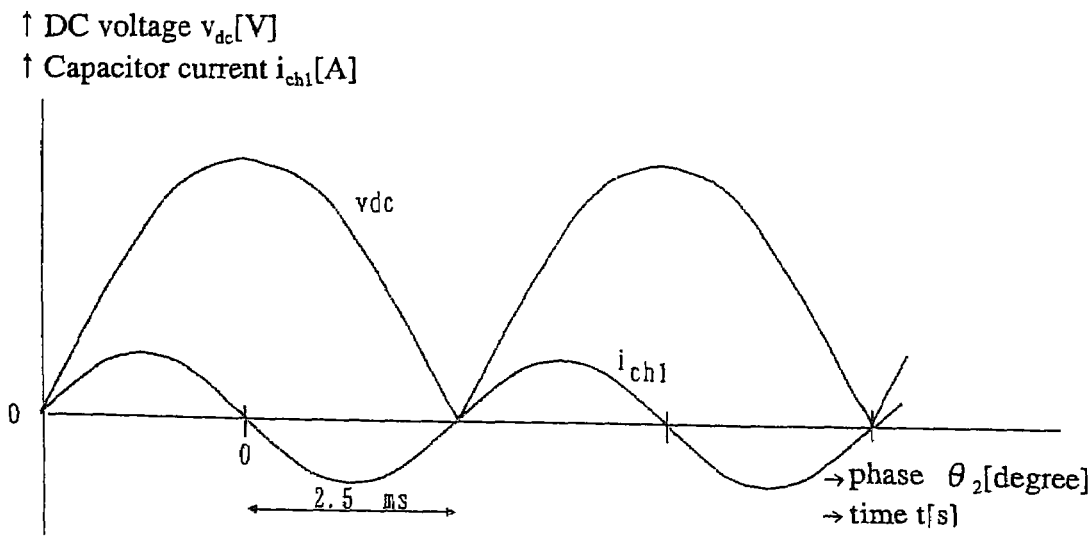
FIG. 24 is a diagram illustrating a voltage at the DC section of the condenser-less inverter circuitry, and a current component of a frequency which is twice of the power frequency, the current flowing in the capacitor section of the condenser-less inverter circuitry.

FIG. 16 is a flowchart explaining an operation of an example according to the present invention in step SP3 in FIG. 14.

In step SP1, the power phase $\theta_1(n)$, q-axis current average value command $|i_q(n)^*|$, and capacitor current $i_c(n)$ are input. In step SP2, operation of $i_q(n)^*=|i_q(n)^*|\cdot\sin^2\theta_1(n)-i_c$ is carried out so as to calculate the q-axis current command $i_q(n)^*$. In step SP3, operation of $i_d(n)^*=-\lambda_a/L_d+(1/L_d)[\{v_{dc}\cdot n/\omega_m(n)\}^2-\{L_q\cdot i_q(n)\}^2]^{1/2}$ carried out so as to calculate the d-axis current command $i_d(n)^*$. Then, operation returns to the original processing.

Therefore, compensation of the capacitor current can be carried out.

FIG. 17 is a flowchart explaining an operation of another example according to the present invention in step SP3 in FIG. 14.

In step SP1, the power phase $\theta_1(n)$, q-axis current phase command ξ(n), and q-axis current average value command $|i_q(n)^*|$ are input. In step SP2, operation of $i_q(n)^*=|i_q(n)^*|\cdot\sin^2\theta_1(n)-\xi(n)$ is carried out so as to calculate the q-axis current command $i_q(n)$. In step SP3, operation of $i_d(n)^*=-\lambda_a/L_d+(1/L_d)[\{v_{dc}\cdot n/\omega_m(n)\}^2-\{L_q\cdot i_q(n)\}^2]^{1/2}$ is carried out so as to calculate the d-axis current command $i_d(n)$. Then, operation returns to the original processing.

Therefore, compensation of the capacitor current can be carried out more easily.

The invention according to one aspect has a characteristic effect that harmonics in power current can be reduced.

An implementation of the present invention carries out the torque controlling for a motor, speed controlling for a motor or the like.

An implementation of the present invention carries out the controlling of torque or current for torque.

An implementation of the present invention has a characteristic effect that harmonics in power current can be reduced.

An implementation of the present invention a characteristic effect that harmonics in power current can be reduce.

An implementation of the present invention carries out the torque controlling for a motor, speed controlling for a motor or the like.

An implementation of the present invention carries out the controlling of torque or current for torque.

An implementation of the present invention has a characteristic effect that harmonics in power current can be reduced by negating the capacitor current.

An implementation of the present invention has a characteristic effect that the operation load can be reduced.

An implementation of the present invention has a characteristic effect that the operation load can be reduced.

An implementation of the present invention has a characteristic effect that the capacitor current can be calculated with accuracy.

An implementation of the present invention has a characteristic effect that the compensation of the capacitor current can be carried out easily.

What is claimed is:

1. An inverter controlling method applied in a system comprising a single-phase rectification circuitry and a three-phase inverter, said method comprising:
    determining a capacitance of a capacitor connected between output terminals of the single-phase rectification circuitry for allowing an output voltage of the single-phase rectification circuitry to pulsate at twice frequency with respect to a power frequency;
    controlling the three-phase inverter for supplying output voltages or output currents from the three-phase inverter to a motor; and
    suppressing a current flowing into the capacitor from a power source via the single-phase rectification circuitry.

2. An inverter controlling method as set forth in claim 1, wherein the method controls the motor for suppressing a current flowing into the capacitor from a power source via the single-phase rectification circuitry.

3. An inverter controlling method as set forth in claim 1, wherein the method controls a torque or current for torque for suppressing a current flowing into the capacitor from a power source via the single-phase rectification circuitry.

4. An inverter controlling apparatus comprising:
    a single-phase rectification circuitry;
    a three-phase inverter; and
    a controller that determines a capacitance of a capacitor connected between output terminals of the single-phase rectification circuitry for allowing an output voltage of the single-phase rectification circuitry to pulsate at twice frequency with respect to a power frequency, and controls the three-phase inverter for supplying output voltages or output currents from the three-phase inverter to a motor; and
    a suppression element for suppressing a current flowing into the capacitor from a power source via the single-phase rectification circuitry.

5. An inverter controlling apparatus comprising:
    a single-phase rectification circuitry;
    a three-phase inverter; and
    a controller that determines a capacitance of a capacitor connected between output terminals of the single-phase rectification circuitry for allowing an output voltage of the single-phase rectification circuitry to pulsate at twice frequency with respect to a power frequency, and controls the three-phase inverter for supplying output voltages or output currents from the three-phase inverter to a motor wherein said controller suppresses a current flowing into the capacitor from a power source via the single-phase rectification circuitry.

6. An inverter controlling apparatus as set forth in claim 5, wherein the controller controls the motor for suppressing a current flowing into the capacitor from a power source via the single-phase rectification circuitry.

7. An inverter controlling apparatus as set forth in claim 5, wherein the controller controls a torque or current for torque for suppressing a current flowing into the capacitor from a power source via the single-phase rectification circuitry.

8. An inverter controlling apparatus as set forth in claim 7, wherein the controller includes a phase determination unit for determining a phase of the current for torque to be a delayed phase.

9. An inverter controlling apparatus comprising:
    a single-phase rectification circuitry; and
    a three-phase inverter; and
    a controller that determines a capacitance of a capacitor connected between output terminals of the single-phase rectification circuitry for allowing an output voltage of the single-phase rectification circuitry to pulsate at twice frequency with respect to a power frequency, and controls the three-phase inverter for supplying output voltages or output currents from the three-phase inverter to a motor, the controller comprising:
    a capacitor current operation unit for calculating a capacitor current flowing into the capacitor from a power source via the single-phase rectification circuitry; and
    a current for torque correction unit for correcting a current for torque by subtracting the obtained capacitor current from the current for torque.

10. An inverter controlling apparatus as set forth in claim 9, wherein the capacitor current operation unit carries out the harmonic analysis of the power current.

11. An inverter controlling apparatus as set forth in claim 10, wherein a harmonic component of a twice frequency with respect to the power frequency is employed as the harmonic analysis result.

12. An inverter controlling apparatus as set forth in claim 9, wherein the capacitor current operation unit outputs the capacitor current based upon stored pattern.

13. An inverter controlling apparatus as set forth in claim 12, further comprising a correction unit for correcting the capacitor current output based upon stored pattern, based upon a direct current voltage detection value.

* * * * *